(12) United States Patent
Ishihara et al.

(10) Patent No.: US 9,732,259 B2
(45) Date of Patent: *Aug. 15, 2017

(54) LAMINATE AND METHOD FOR PRODUCING SAME

(71) Applicant: BRIDGESTONE CORPORATION, Tokyo (JP)

(72) Inventors: Takenobu Ishihara, Kodaira (JP); Atsushi Hara, Kodaira (JP); Shuuyou Akama, Kodaira (JP); Akiko Gondoh, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/759,356

(22) PCT Filed: Dec. 20, 2013

(86) PCT No.: PCT/JP2013/084372
§ 371 (c)(1),
(2) Date: Jul. 6, 2015

(87) PCT Pub. No.: WO2014/109217
PCT Pub. Date: Jul. 17, 2014

(65) Prior Publication Data
US 2015/0353791 A1 Dec. 10, 2015

(30) Foreign Application Priority Data

Jan. 8, 2013 (JP) ................................ 2013-001312
May 9, 2013 (JP) ................................ 2013-099711
May 23, 2013 (JP) ................................ 2013-109150
May 27, 2013 (JP) ................................ 2013-111055

(51) Int. Cl.
| | |
|---|---|
| *B32B 37/12* | (2006.01) |
| *C09J 175/06* | (2006.01) |
| *C09D 175/06* | (2006.01) |
| *B05D 3/06* | (2006.01) |
| *C09D 175/04* | (2006.01) |
| *C09J 175/04* | (2006.01) |
| *C08G 18/78* | (2006.01) |
| *C08G 18/79* | (2006.01) |
| *C08G 18/80* | (2006.01) |
| *C08G 18/38* | (2006.01) |
| *C09J 4/00* | (2006.01) |
| *B32B 7/12* | (2006.01) |
| *B32B 25/04* | (2006.01) |

(52) U.S. Cl.
CPC ............. *C09J 175/06* (2013.01); *B05D 3/06* (2013.01); *B32B 7/12* (2013.01); *B32B 25/04* (2013.01); *B32B 37/12* (2013.01); *B32B 37/1207* (2013.01); *C08G 18/3876* (2013.01); *C08G 18/7831* (2013.01); *C08G 18/7837* (2013.01); *C08G 18/792* (2013.01); *C08G 18/8025* (2013.01); *C08G 18/8029* (2013.01); *C09D 175/04* (2013.01); *C09D 175/06* (2013.01); *C09J 4/00* (2013.01); *C09J 175/04* (2013.01); *B32B 2037/1269* (2013.01); *B32B 2605/00* (2013.01)

(58) Field of Classification Search
CPC ..... C09J 175/04; C09J 175/06; C09D 175/04; C09D 175/06; B32B 37/12; B32B 37/1207; B32B 2037/1269; B05D 3/06
See application file for complete search history.

(56) References Cited

U.S. PATENT DOCUMENTS

| | | | | |
|---|---|---|---|---|
| 2008/0103281 A1* | 5/2008 | Harvey | ............ | C08F 2/46 528/58 |
| 2009/0250150 A1* | 10/2009 | Negroni | ............ | B29D 30/0061 152/450 |
| 2010/0048831 A1* | 2/2010 | Janowicz | ............ | C08G 18/3876 525/452 |

(Continued)

FOREIGN PATENT DOCUMENTS

| | | |
|---|---|---|
| JP | 3-252442 A | 11/1991 |
| JP | 8-134163 A | 5/1996 |

(Continued)

OTHER PUBLICATIONS

International Search Report for PCT/JP2013/084372 dated Apr. 1, 2014.

(Continued)

*Primary Examiner* — Michael L Leonard
(74) *Attorney, Agent, or Firm* — Sughrue Mion, PLLC

(57) ABSTRACT

The present invention provides a laminate obtained by arranging a composition to be in contact with a rubber, wherein the composition is prepared by blending a polythiol compound (A), an isocyanate group-containing compound (B) and a radical generator (C), and wherein the ratio of the total molar number of the isocyanate group contained in the isocyanate-containing compound (B) to the total molar number of the thiol group contained in the polythiol compound (A) (isocyanate group/thiol group) is from 0.2 to 0.78, and provides a method for producing the laminate. The present invention thus provides a laminate, in which the rubber layer is adhered using at least one of an adhesive or an adhesive sheet capable of strongly adhering a rubber member, especially a vulcanized rubber member, and provides a laminate adhering to a rubber article using at least one of a coating agent and a coating sheet.

12 Claims, No Drawings

(56) References Cited

U.S. PATENT DOCUMENTS

2012/0232201 A1    9/2012   Cotugno et al.
2015/0353791 A1   12/2015   Ishihara et al.

FOREIGN PATENT DOCUMENTS

| JP | 8-150684 A | 6/1996 |
| JP | 10-139901 A | 5/1998 |
| JP | 10-306210 A | 11/1998 |
| JP | 11-279528 A | 10/1999 |
| JP | 2003-238797 A | 8/2003 |
| JP | 2007-2051 A | 1/2007 |
| JP | 2009-538768 A | 11/2009 |
| JP | 2013-10295 A | 1/2013 |
| JP | 2013-505348 A | 2/2013 |

OTHER PUBLICATIONS

Communication dated Sep. 6, 2016, issued by the Japan Patent Office in corresponding Japanese Application No. 2013-109150.

\* cited by examiner

LAMINATE AND METHOD FOR PRODUCING SAME

CROSS REFERENCE TO RELATED APPLICATIONS

This application is a National Stage of International Application No. PCT/JP2013/084372 filed Dec. 20, 2013, claiming priority based on Japanese Patent Application No. 2013-001312 filed Jan. 8, 2013, Japanese Patent Application No. 2013-099711 filed May 9, 2013, Japanese Patent Application No. 2013-109150 filed May 23, 2013, and Japanese Patent Application No. 2013-111055 filed May 27, 2013, the contents of all of which are incorporated herein by reference in their entirety.

TECHNICAL FIELD

The present invention relates to a laminate and a method for producing it, and precisely relates to a laminate that comprises rubber layers adhered via an adhesive layer formed from a specific composition, or to a laminate obtained by adhering a coating agent or a coating sheet containing the composition to the surface of a rubber article.

BACKGROUND ART

Heretofore, a material having a good adhesion force to a vulcanized rubber member is desired, but there is not known any material capable of realizing a sufficient adhesion force. As a method of bonding a vulcanized rubber member, for example, PTL 1 discloses a technique of surface-treating a vulcanized rubber member and bonding another member to the treated surface via an adhesive therebetween.

In addition, heretofore also desired is a coating material having good adhesiveness to a rubber article such as a tire or the like, but there is not known any material capable of realizing sufficient adhesiveness. As a method of bonding a vulcanized rubber article, for example, PTL 2 discloses use of an aqueous dispersion that contains a 1,2-polybutadiene hydroxyl group-containing material, a liquid polybutadiene isocyanated material and a polyolefin resin as a surface-treating agent for vulcanized rubber. PTL 3 proposes a polymer tire coating obtained from an aqueous emulsion that contains at least a crosslinking polymer base, a vulcanizing agent and a specific surfactant.

Further, PTL 4 discloses a method of decorating the side surfaces of a tire, which comprises a first layer forming step of applying a UV-curable thermoplastic elastomer to the side surfaces of a tire and irradiating the applied UV-curable thermoplastic elastomer with UV rays to form a cured layer, and a lamination step of applying a UV-curable thermoplastic elastomer to the formed cured layer and irradiating the applied UV-curable thermoplastic elastomer with LTV rays to form a cured layer, and which therefore forms a decoration of the laminate of plural cured layers on the side surfaces of the tire.

CITATION LIST

Patent Literature

PTL 1: JP-A 10-139901
PTL 2: JP-A 3-252442
PTL 3: JP-A 2013-505348
PTL 4: JP-A 2013-10295

SUMMARY OF INVENTION

Technical Problem

However, in the method described in PTL 1, vulcanized rubber is subjected to surface treatment, and then bonded to another material via an adhesive, that is, the method needs labor for the surface treatment. In addition, since a polyurethane adhesive is used, the adhesion force thereof is insufficient.

In the method described in PTL 2, a polyurethane surface-treating agent is used, and therefore the adherend is not bonded to the rubber article by covalent bonding, and the adhesiveness thereof to the rubber article is low.

In the method described in PTL 3, a polymer tire coating prepared from an aqueous emulsion containing a specific surfactant is applied to a rubber article such as a tire or the like by spraying or brushing thereon, and therefore the method is unsuitable for forming the coating on at least a part of the surface of the rubber article, and does not impart decoration thereto.

In the method described in PTL 4, a step of forming a cured layer through irradiation of a UV-curable thermoplastic elastomer such as a (meth)acryloyl group-having oligomer or the like, with UV rays is repeated, and therefore the method takes a lot of labor in formation of the coating.

Given the situation, an object of the present invention is to provide a laminate that comprises a rubber layer adhered thereto by the use of at least one of an adhesive capable of readily and strongly adhering to rubber, especially vulcanized rubber not requiring any troublesome labor, and an adhesive sheet formed from the adhesive, to provide a laminate having, as adhered to at least a part of the surface of an adherend, a coating agent or a coating sheet capable of imparting decoration thereto, by the use of a coating agent capable of readily and strongly adhering to the adherend not requiring any troublesome labor, and to provide a method for producing these.

Solution to Problem

The present inventors have found that the above-mentioned problems can be solved by using a composition prepared by blending a polythiol compound (A), an isocyanate group-containing compound (B) and a radical generator (C) in a specific ratio, and have completed the present invention.

Specifically, the present invention relates to the following [1] go [5].

[1] A laminate obtained by arranging a composition to be in contact with a rubber, wherein the composition is prepared by blending a polythiol compound (A), an isocyanate group-containing compound (B) and a radical generator (C), and wherein the ratio of the total molar number of the isocyanate group contained in the isocyanate-containing compound (B) to the total molar number of the thiol group contained in the polythiol compound (A) (isocyanate group/thiol group) is from 0.2 to 0.78.

[2] A method for producing a laminate that comprises a bonded body of a rubber and an adherend, the method comprising:
applying an adhesive that contains a composition prepared by blending a polythiol compound (A), an isocyanate group-containing compound (B) and a radical generator (C), in which the ratio of the total molar number of the isocyanate group contained in the isocyanate-containing compound (B) to the total molar number of the thiol group contained in the polythiol compound (A) (isocyanate group/thiol group) is from 0.2 to 0.78, to at least one of the rubber and the adherend to give a layered body of the rubber and the adherend via the applied adhesive therebetween, and then subjecting the layered body to at least one of heating and photoirradiation.

[3] A method for producing a laminate that comprises a bonded body of a rubber and an adherend, the method comprising:

forming an adhesive sheet that contains a polythiol compound (A), an isocyanate group-containing compound (B) and a radical generator (C), in which the ratio of the total molar number of the isocyanate group contained in the isocyanate-containing compound (B) to the total molar number of the thiol group contained in the polythiol compound (A) (isocyanate group/thiol group) is from 0.2 to 0.78, then layering the rubber and the adherend via the adhesive sheet to prepare a layered body, and thereafter subjecting the layered body to at least one of heating and photoirradiation.

[4] A method for producing a laminate of a rubber composite that comprises a coating material and a rubber article, the method comprising:

adhering a coating agent that contains a composition prepared by blending a polythiol compound (A), an isocyanate group-containing compound (B) and a radical generator (C), in which the ratio of the total molar number of the isocyanate group contained in the isocyanate-containing compound (B) to the total molar number of the thiol group contained in the polythiol compound (A) (isocyanate group/ thiol group) is from 0.20 to 0.78, to at least a part of the surface of the rubber article, and then subjecting the coating agent to at least one of heating and photoirradiation to form the coating material.

[5] A method for producing a laminate of a rubber composite that comprises a coating material and a rubber article, the method comprising:

forming a coating sheet that comprises a coating agent containing a composition prepared by blending a polythiol compound (A), an isocyanate group-containing compound (B) and a radical generator (C), in which the ratio of the total molar number of the isocyanate group contained in the isocyanate-containing compound (B) to the total molar number of the thiol group contained in the polythiol compound (A) (isocyanate group/thiol group) is from 0.20 to 0.78, then adhering the coating sheet to at least a part of the surface of the rubber article, and thereafter subjecting the coating sheet to at least one of heating and photoirradiation to form the coating material.

Advantageous Effects of Invention

According to the present invention, there can be provided a technique of readily and strongly adhering a rubber, especially a vulcanized rubber and an adherend not requiring any troublesome labor, and a laminate in which the rubber, especially the vulcanized rubber and the adherend is strongly adhered. In addition, there can be provided a laminate of a rubber composite that comprises a coating material capable of imparting decoration and a rubber article, using a coating agent capable of readily being readily adhered to a rubber article not requiring any troublesome labor and capable of being strongly and airtightly adhered thereto.

In the present invention, in addition, there can be provided a transparent coating agent, which imparts adhesiveness to rubber articles more effectively through photoirradiation. Further, there can be prepared a coating agent not using any organic solvent, and therefore the present invention exhibits another effect of not providing any environmental load.

DESCRIPTION OF EMBODIMENTS

Laminate

The laminate of the present invention comprises a composition and a rubber, and is obtained by arranging the composition to be in contact with the rubber, wherein the composition is prepared by blending a polythiol compound (A), an isocyanate group-containing compound (B) and a radical generator (C), and wherein the ratio of the total molar number of the isocyanate group contained in the isocyanate-containing compound (B) to the total molar number of the thiol group contained in the polythiol compound (A) (isocyanate group/thiol group) is from 0.2 to 0.78.

The laminate of the present invention is a laminate comprising plural layers adhering to each other, and includes a bonded body of a rubber and an adherend, and a rubber composite comprising a coating material and a rubber article. Preferably, the laminate of the present invention includes the following two embodiments (1) and (2).

(1) A laminate wherein rubber comprises at least one or more rubber layers, and at least one layer of the rubber layers is adhered to the adjacent layer via an adhesive layer that comprises the composition.

In this, the adhesive layer that comprises the composition may be formed by applying an adhesive comprising the composition to at least one of the rubber layer and the adherend, or may be an adhesive sheet comprising an adhesive that contains the composition.

(2) A rubber composite (laminate) wherein rubber is a rubber article and wherein a coating agent containing the composition or a coating sheet formed of the composition is adhered to a part of the surface of the rubber article.

In the above-mentioned embodiment (1), the plural layers constituting the laminate may be all rubber layers, or may contain any other layer than a rubber layer. The dimension of each layer and the number of the layers may be suitably selected depending on the intended purpose.

In the above-mentioned embodiment (2), the coating agent or the coating sheet in the laminate of the rubber composite may be a single layer or may comprise plural layers, or may form a three-dimensional form. The shape of the rubber article is not specifically defined. It will be enough that the coating material is adhered to at least a part of the surface of the rubber particle.

In the laminate of the present invention, it is considered that the carbon atom in the rubber that the rubber layer kept in contact with the adhesive or the adhesive sheet has, or the carbon atom in the rubber component that the rubber article kept in contact with the coating agent or the coating sheet has would form a carbon-sulfur bond with the sulfur atom of the thiol group of the polythiol compound (A) that the adhesive, the adhesive sheet, the coating agent or the coating sheet contains.

It is considered that the carbon-sulfur bond would be formed through reaction of any other part of the polythiol compound (A) with the radical generator (C) to give a thiyl radical followed by reaction of the thiyl radical with the carbon-carbon double bond existing in the rubber (rubber layer or rubber article), or would be formed through hydrogen-drawing reaction from the carbon-carbon bond main chain existing in the rubber (rubber layer or rubber article) to cause chemical bonding of the sulfur atom of the thiol group of the polythiol compound (A) to the carbon atom of the carbon-carbon bond.

In particular, in the laminate of the present invention, it is desirable that the carbon atom of the carbon-carbon double bond that the rubber (the rubber layer or the rubber article) has forms a carbon-sulfur bond with the sulfur atom of the thiol group of the polythiol compound (A) that the composition contains.

[Composition]

The composition in the present invention is prepared by blending a polythiol compound (A), an isocyanate group-containing compound (B) and a radical generator (C), in which the ratio of the total molar number of the isocyanate group contained in the isocyanate-containing compound (B) to be incorporated, to the total molar number of the thiol group contained in the polythiol compound (A) to be incorporated (isocyanate group/thiol group) is from 0.2 to 0.78.

The composition in the present invention can strongly adhere not only to an unvulcanized rubber but also even to a vulcanized rubber. The reason could be presumed as follows.

A part of the polythiol compound (A) and the isocyanate group-containing compound (B) could undergo urethanation reaction, and the composition could be thereby firmly cured. The other part of the polythiol compound (A) would react with the radical generator (C) to give a thiyl radical, and the thiyl radical would react with the carbon-carbon double bond existing in rubber. Through such thiol-ene reaction, the composition can chemically bond to rubber and therefore the composition can strongly adhere to the rubber. In particular, not only unvulcanized rubber but also vulcanized rubber has a carbon-carbon double bond, and therefore it is considered that the composition in the present invention can strongly adhere to rubber, especially to vulcanized rubber.

It is also considered that, through the hydrogen-drawing reaction from the carbon-carbon bond main chain existing in rubber, the sulfur atom of the thiol group of the polythiol compound (A) and the carbon atom of the carbon-carbon bond could chemically bond. Accordingly, rubber in the present invention may not always have a carbon-carbon double bond therein.

In this description, the polythiol compound (A), the isocyanate group-containing compound (B), the radical generator (C), the urethanation catalyst (D) and the surface conditioner (E) may be referred to as a component (A), a component (B), a component (C), a component (D) and a component (E), respectively.

<Polythiol Compound (A)>

In the present invention, the polythiol compound (A) is a compound having two or more thiol groups in one molecule.

Not specifically defined, the polythiol compound (A) preferably has from 2 to 6 thiol groups in one molecule, from the viewpoint of improving the adhesiveness of the composition.

The polythiol compound (A) includes primary, secondary and tertiary ones, but in the present invention, preferred is a primary compound from the viewpoint of improving the adhesiveness of the composition.

The molecular weight of the polythiol compound (A) is preferably at most 3000 from the viewpoint of improving the adhesiveness of the composition, more preferably at most 2000, even more preferably at most 1000, still more preferably at most 900, further more preferably at most 800. In case where the polythiol compound (A) is a polymer, the molecular weight is a styrene-equivalent number-average molecular weight thereof.

The polythiol compound (A) includes an aliphatic polythiol optionally containing a hetero atom, and an aromatic polythiol optionally containing a hetero atom, and from the viewpoint of improving the adhesiveness of the composition, preferred here is an aliphatic polythiol optionally containing a hetero atom.

Here, the aliphatic polythiol optionally containing a hetero atom means an aliphatic compound having two or more thiol groups in one molecule and optionally containing a hetero atom therein. The aromatic polythiol optionally containing a hetero atom means an aromatic compound having two or more thiol groups in one molecule and optionally containing a hetero atom therein.

The hetero atom is preferably at least one selected from oxygen, nitrogen, sulfur, phosphorus, halogen atom, and silicon, from the viewpoint of improving the adhesiveness of the composition. More preferred is at least one selected from oxygen, nitrogen, sulfur, phosphorus and halogen atom; and even more preferred is at least one selected from oxygen, nitrogen and sulfur.

The aliphatic polythiol optionally containing a hetero atom includes, for example, polythiols where the other moiety than the thiol group is an aliphatic hydrocarbon, such as alkanedithiols having from 2 to 20 carbon atoms, etc.; polythiols derived from alcohol-halohydrin adducts by substituting the halogen atom therein with a thiol group; polythiols of hydrogen sulfide reaction products of polyepoxide compounds; thioglycolates obtained through esterification of a polyalcohol having from 2 to 6 hydroxyl groups in one molecule with a thioglycolic acid; mercapto-fatty acid esters obtained through esterification of a polyalcohol having from 2 to 6 hydroxyl group in one molecule with a mercapto-fatty acid; thiol isocyanurate compounds obtained through reaction of an isocyanurate compound and a thiol; polysulfide group-containing thiols; thiol group-modified silicones; thiol group-modified silsesquioxanes, etc.

The polyalcohol having from 2 to 6 hydroxyl group in the molecule includes alkanedithiols having from 2 to 20 carbon atoms, poly(oxyalkylene) glycols, glycerol, diglycerol, trimethylolpropane, ditrimethylolpropane, pentaerythritol, dipentaerythritol, etc.

Of those, from the viewpoint of improving the adhesiveness of the composition, more preferred are polythiols where the other moiety than the thiol group is an aliphatic hydrocarbon; polythiols derived from alcohol-halohydrin adducts by substituting the halogen atom therein with a thiol group; polythiols of hydrogen sulfide reaction products of polyepoxide compounds; thioglycolates; mercapto-fatty acid esters; and thiol isocyanurate compounds. Even more preferred are mercapto-fatty acid esters, and thiol isocyanurate compounds, and still more preferred are mercapto-fatty acid esters. From the same viewpoint, more preferred are thiols not containing a polysulfide group or a siloxane bond.

(Polythiols where the Other Moiety than Thiol Group is Aliphatic Hydrocarbon)

Examples of the polythiols where the other moiety than the thiol group is an aliphatic hydrocarbon are alkanedithiols having from 2 to 20 carbon atoms.

The alkanedithiols having from 2 to 20 carbon atoms include 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,8-octanedithiol, 1,10-decanedithiol, 1,1-cyclohexanedithiol, 1,2-cyclohexanedithiol, etc.

(Thioglycolates)

The thioglycolates include 1,4-butanedithiol bisthioglycolate, 1,6-hexanediol bisthioglycolate, trimethylolpropane tristhioglycolate, pentaerythritol tetrakisthioglycolate, etc.

(Mercapto-Fatty Acid Esters)

The mercapto-fatty acid esters are preferably mercapto-fatty acid esters having a primary thiol group, from the viewpoint of improving the adhesiveness of the composition; and more preferred are β-mercaptopropionates of polyalcohols having from 2 to 6 hydroxyl groups in the molecule. The primary thiol group-having mercapto-fatty acid esters are preferably those in which the number of the thiol groups in one molecule is from 4 to 6, more preferably 4 or 6, even more preferably 4, from the viewpoint of improving the adhesiveness of the composition.

The primary thiol group-having β-mercaptopropionates are preferably tetraethylene glycol bis(3-mercaptopropionate) (EGMP-4), trimethylolpropane tris(3-mercaptopropionate) (TMMP), pentaerythritol tetrakis(3-mercaptopropionate) (PEMP), and dipentaerythritol hexakis(3-mercaptopropionate) (DPMP). Of those, preferred are PEMP and DPMP, and more preferred is PEMP.

The secondary thiol group-having β-mercaptopropionates includes esters of a β-mercaptobutanoic acid and a polyalcohol having from 2 to 6 hydroxyl groups in the molecule, concretely 1,4-bis(3-mercaptobutyryloxy)butane, pentaerythritol tetrakis(3-mercaptobutyrate), etc.

(Thiol Isocyanurate Compounds)

The thiol isocyanurate compounds that are obtained through reaction of an isocyanurate compound and a thiol are preferably primary thiol group-having thiol isocyanurate compounds, from the viewpoint of improving the adhesiveness of the composition. Also from the viewpoint of improving the adhesiveness of the composition, the primary thiol group-having thiol isocyanurate compounds are preferably those having from 2 to 4 thiol groups in one molecule, more preferably 3 thiol groups.

As the primary thiol group-having thiol isocyanurate compounds, preferred is tris-[(3-mercaptopropionyloxy)-ethyl]isocyanurate (TEMPIC).

(Thiol Group-Modified Silicones)

The thiol group-modified silicones include KF-2001, KF-2004, X-22-167B (all trade names by Shin-etsu Chemical Industry), SMSO42, SMS022 (both trade names by Gelest), PS849, PS850 (both trade names by UCT), etc.

(Aromatic Polythiols)

The aromatic polythiols include 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, etc.

<Isocyanate Group-Containing Compound (B)>

The isocyanate group-containing compound (B) includes aromatic, aliphatic and alicyclic diisocyanates and their modified derivatives, etc.

The aromatic, aliphatic and alicyclic diisocyanates include, for example, tolylene diisocyanate (TDI), diphenylmethane diisocyanate (MDI), xylylene diisocyanate (XDI), naphthylene diisocyanate (NDI), phenylene diisocyanate (PPDI), m-tetramethylxylylene diisocyanate (TMXDI), methylcyclohexane diisocyanate (hydrogenated TDI), dicyclohexylmethane diisocyanate (hydrogenated MDI), cyclohexane diisocyanate (hydrogenated PPDI), bis(isocyanatomethyl)cyclohexane (hydrogenated XDI), norbornene diisocyanate (NBDI), isophorone diisocyanate (IPDI), hexamethylene diisocyanate (HDI), butane diisocyanate, 2,2,4-trimethylhexamethylene diisocyanate, 2,4,4-trimethylhexamethylene diisocyanate, etc.

In case where the polythiol compound (A) to be incorporated is a mercapto-fatty acid ester or a thiol isocyanurate compound, the isocyanate group-containing compound (B) to be incorporated is preferably one or more of hexamethylene diisocyanate (HDI), isophorone diisocyanate (IPDI), tolylene diisocyanate (TDI), xylylene diisocyanate (XDI), and diphenylmethane diisocyanate (MDI). Of those, more preferred are one or more of hexamethylene diisocyanate (HDI), isophorone diisocyanate (IPDI), xylylene diisocyanate (XDI), bis(isocyanatomethyl)cyclohexane (hydrogenated XDI) and tolylene diisocyanate (TDI).

The modified derivatives of aromatic, aliphatic or alicyclic diisocyanates include TMP (trimethylolpropane) adduct-type modified derivatives to be obtained through reaction of a trimethylolpropane and an isocyanate, isocyanurate-type modified derivatives to be obtained through trimerization of an isocyanate, a burette-type modified derivatives to be obtained through reaction of a urea and an isocyanate, an allophanate-type modified derivatives to be obtained through reaction of a urethane and an isocyanate, a prepolymer to be obtained through reaction with a polyol, etc., and any of these may be suitably used here.

As the TMP adduct-type modified derivatives, the isocyanurate-type modified derivatives, the burette-type modified derivatives and the allophanates-type modified derivatives, the following are preferred from the viewpoint of improving the adhesiveness of the composition.

Specifically, as the TMP adduct-type modified derivatives, preferred are TMP adduct-type modified derivatives to be obtained through reaction of TMP and TDI, TMP adduct-type modified derivatives to be obtained through reaction of TMP and XDI, TMP adduct-type modified derivatives to be obtained through reaction of TMP and hydrogenated XDI, TMP adduct-type modified derivatives to be obtained through reaction of TMP and IPDI, TMP adduct-type modified derivatives to be obtained through reaction of TMP and HDI, and TMP adduct-type modified derivatives to be obtained through reaction of TMP and MDI.

As the isocyanurate-type modified derivatives, preferred are isocyanurate-type modified derivatives to be obtained through trimerization of HDI, isocyanurate-type modified derivatives to be obtained through trimerization of IPDI, isocyanurate-type modified derivatives to be obtained through trimerization of TDI, and isocyanurate-type modified derivatives to be obtained through isomerization of hydrogenated XDI.

As the burette-type modified derivatives, preferred are burette-type modified derivatives to be obtained through reaction of urea and HDI.

As the allophanate-type modified derivatives, preferred are allophanate-type modified derivatives to be obtained through reaction of urethane and IPDI.

As the polythiol compound (A) to be combined with at least one of the above-mentioned TMP adduct-type modified derivatives, isocyanurate-type modified derivatives, burette-type modified derivatives and allophanates-type modified derivatives, preferred are one or two of primary thiol group-having β-mercaptopropionates and primary thiol group-having thiol isocyanurate compounds.

Here, the primary thiol group-having β-mercaptopropionate is preferably at least one of pentaerythritol tetrakis(3-mercaptopropionate) (PEMP) and dipentaerythritol hexakis (3-mercaptopropionate) (DPMP). As the primary thiol group-having thiol isocyanate compound, preferred is a primary thiol group-having thiol isocyanurate compound in which the number of the thiol groups in one molecule is 3, and more preferred is tris-[(3-mercaptopropionyloxy)-ethyl] isocyanurate (TEMPIC).

<Radical Generator (C)>

As the radical generator (C), usable here is at least one of a thermal radical generator and a photoradical generator. Of those, from the viewpoint of improving the adhesion force of the composition and from the viewpoint that the composition can adhere nontransparent (lightproof) rubber, preferred is a thermal radical generator, more preferred is a thermal radical generator comprising a peroxide, and even more preferred is a thermal radical generator comprising an organic peroxide.

One or more different types of radical generators (C) are usable here either singly or as combined.

The thermal radical generator comprising an organic peroxide includes, for example, t-butyl 2-ethylperoxyhexanoate, dilauroyl peroxide, 1,1,3,3-tetramethylbutylperoxy-2-ethylhexanoate, 1,1-di(t-hexylperoxy)cyclohexanone, di-t-butyl peroxide, t-butylcumyl peroxide, 1,1-di(t-hexylperoxy)-3,3,5-trimethylcyclohexane, t-amylperoxy-2-ethyl hexanoate, di(2-t-butylperoxyisopropyl)benzene, di(t-butyl) peroxide, benzoyl peroxide 1,1'-di (2-t-butylperoxyisopropyl)benzene, benzoyl peroxide, 1,1'-di(t-butylperoxy)cyclohexane, di(3,5,5-trimethylhexanoyl) peroxide, t-butylperoxy neodecanoate, t-hexylperoxy neodecanoate, dicumyl peroxide, etc. Of those, preferred is at least one of t-butyl-2-ethylperoxyhexanoate, dilauroyl peroxide, 1,1,3,3-tetramethylbutylperoxy-2-ethylhexanoate, 1,1-di(t-butylperoxy)cyclohexanone, di-t-butyl peroxide, and t-butylcumyl peroxide. One alone or two more different types of the thermal radical generators comprising an organic peroxide may be used here with singly or as combined.

The thermal radical generator comprising an inorganic peroxide includes a redox generator comprising a combination of an oxidizing agent and a reducing agent, such as a combination of hydrogen peroxide and an iron(II) salt, a combination of a persulfate and sodium hydrogensulfite, etc. One alone or two more different types of the thermal radical generators comprising an inorganic organic peroxide may be used here with singly or as combined.

As the photoradical generator, any known ones may be used here widely with no specific limitation thereon.

For example, there is mentioned an intramolecular-cleaving photoradical generator, which includes a benzoin alkyl ether-type photoradical generator such as benzoin ethyl ether, benzoin isobutyl ether, benzoin isopropyl ether, etc.; an acetophenone-type photoradical generator such as 2,2-diethoxyacetophenone, 4'-phenoxy-2,2-dichloroacetophenone, etc.; a propiophenone-type photoradical generator such as 2-hydroxy-2-methylpropiophenone, 4'-isopropyl-2-hydroxy-2-methylpropiophenone, 4'-dodecyl-2-hydroxy-2-methylpropiophenone, etc.; benzyl dimethyl ketal, 1-hydroxycyclohexyl phenyl ketone; an anthraquinone-type photoradical generator such as 2-ethylanthraquinone, 2-chloroanthraquinone, etc.; an acylphosphine oxide-type photoradical generator, etc.

As the other hydrogen-drawing photoradical generator usable here, there are mentioned a benzophenone/amine-type photoradical generator, a Michler ketone/benzophenone-type photoradical generator, a thioxanthone/amine-type photoradical generator, etc. Also usable here is a non-extracting photoradical generator for preventing migration of an unreacted photoradical generator. For example, there are mentioned a polymerized derivative of an acetophenone-type radical generator, and a benzophenone derivative obtained by adding the double bond of an acrylic group to benzophenone.

One alone or two or more types of these photoradical generators may be used here either singly or as combined.

<Optional Component>

Any optional component may be incorporated in the composition in the present invention. The optical component includes a urethanation catalyst, a surface conditioner, a solvent, a binder, a filler, a pigment dispersant, a conductivity-imparting agent, a UV absorbent, an antioxidant, a drying inhibitor, a penetrant, a pH regulator, a metal sequestering agent, an antibacterial antifungal agent, a surfactant, a plasticizer, a wax, a leveling agent, etc.

(Urethanation Catalyst (D))

As the urethanation catalyst (D), usable here is any urethanation catalyst. The urethanation catalyst includes organic tin compounds such as dibutyltin dilaurate, dibutyltin diacetate, dibutyltin thiocarboxylate, dibutyltin dimaleate, dioctyltin thiocarboxylate, tin octenoate, monobutyltin oxide, etc.; inorganic tin compounds such as stannous chloride, etc.; organic lead compounds such as lead octenoate, etc.; amines such as bis(2-diethylaminoethyl) ether, N,N,N',N'-tetramethylhexamethylenediamine, triethylenediamine (TEDA), benzyldimethylamine, 2,2'-dimorpholinoethyl ether, N-methylmorpholine, etc.; organic sulfonic acids such as p-toluenesulfonic acid, methanesulfonic acid, fluorosulfuric acid, etc.; inorganic acids such as sulfuric acid, phosphoric acid, perchloric acid, etc.; bases such as sodium alcoholate, lithium oxide, aluminium alcoholate, sodium hydroxide, etc.; titanium compounds such as tetrabutyl titanate, tetraethyl titanate, tetraisopropyl titanate, etc.; bismuth compounds; quaternary ammonium salts, etc. Of those, preferred are amines, and more preferred is triethylenediamine (TEDA). One alone or two or more of such catalysts may be used here either singly or as combined.

Preferably, the composition contains the urethanation catalyst (D) in an amount of from 0.0001 to 0.1% by mass.

(Surface Conditioner (E))

As the surface conditioner (E), usable here is any surface conditioner. The surface conditioner includes acrylic, vinylic, silicone-based, fluorine-containing and the like surface conditioners. Of those, preferred are silicone-based surface conditioners from the viewpoint of the compatibility and the surface tension-lowering capability thereof.

Preferably, the composition contains the surface conditioner (E) in an amount of from 0.001 to 10% by mass.

(Solvent)

Not specifically defined, the solvent may be any one not reacting with the other compounding ingredients, and includes an aromatic solvent and an aliphatic solvent.

Specific examples of the aromatic solvent include toluene, xylene, etc. The aliphatic solvent includes hexane, etc.

<Amount of Each Component>

The ratio of the total molar number of the isocyanate group contained in the isocyanate-containing compound (B) incorporated to the total molar number of the thiol group contained in the polythiol compound (A) incorporated (isocyanate group/thiol group) is from 0.20 to 0.78. When the ratio (isocyanate group/thiol group) is less than 0.20, then the composition could not fully and firmly cure and the adhesion strength thereof would be small. On the other hand, when the ratio (isocyanate group/thiol group) is more than 0.78, then the thiol-ene reaction could not sufficiently run on between the thiol group and the carbon-carbon double bond of a rubber member since the amount of the thiol group is insufficient and, as a result, the composition could not be firmly adhere to the rubber member and the adhesion strength thereof would be small. Consequently, the ratio (isocyanate group/thiol group) is preferably 0.30 or more and preferably 0.70 or less, and is preferably from 0.40 to 0.70.

Here, the total molar number of the thiol group contained in the polythiol compound (A) to be incorporated can be calculated by multiplying the molar number of the polythiol compound (A) to be incorporated by the number of the thiol groups that one molecule of the polythiol compound (A) has.

The total molar number of the isocyanate group contained in the isocyanate group-containing compound (B) to be incorporated may be measured according to the Method B in JIS K1603-1.

Further, the molar number ratio (isocyanate group/thiol group) may be calculated by dividing the total molar number of the isocyanate group contained in the isocyanate group-containing compound (B) to be incorporated, as measured in the manner as above, by the total molar number of the thiol group contained in the polythiol compound (A) to be incorporated.

The ratio of the total molar number of the radical generator (C) to be incorporated to the total molar number of the thiol group contained in the polythiol compound (A) to be incorporated (radical generator (C)/thiol group) is preferably 0.025 or more. With this, the adhesiveness of the composition could improve. From this viewpoint, the ratio (radical generator (C)/thiol group) is preferably 0.03 or more, more preferably 0.035 or more, even more preferably 0.04 or more. From the viewpoint of improving the adhesiveness and/or airtight stickiness of the composition, the ratio (radical generator (C)/thiol group) is preferably 0.5 or less, more preferably 0.45 or less, even more preferably 0.4 or less.

When the radical generator (C) to be incorporated contains a photoradical generator, the ratio of the total molar number of the photoradical generator to the total molar number of the thiol group contained in the polythiol compound (A) (photoradical generator/thiol group) is preferably 0.0005 or more. With this, the adhesiveness and/or the airtight stickiness of the composition could improve. From this viewpoint, the ratio (photoradical generator/thiol group) is more preferably 0.001 or more, even more preferably 0.005 or more. However, an excessive photoradical generator causes cost increase, and therefore from the viewpoint of economic efficiency, the ratio is preferably 0.2 or less, more preferably 0.1 or less, even more preferably 0.05 or less.

When the radical generator (C) contains a thermal radical generator, the ratio of the total molar number of the thermal radical generator to the total molar number of the thiol group contained in the polythiol compound (A) (radical generator (C)/thiol group) is preferably 0.025 or more. With this, the adhesiveness and/or the airtight stickiness of the composition could improve. From this viewpoint, the ratio (thermal radical generator/thiol group) is preferably 0.03 or more, more preferably 0.035 or more, and even more preferably 0.04 or more. Also from the viewpoint of improving the adhesiveness and/or the airtight stickiness of the composition, the ratio (thermal radical generator/thiol group) is preferably 0.5 or less, more preferably 0.45 or less, even more preferably 0.4 or less.

When the radical generator (C) contains a photoradical generator and a thermal radical generator, the ratio of the total molar number of the photoradical generator and the thermal radical generator to the total molar number of the thiol group contained in the polythiol compound (A) {(photoradical generator and thermal radical generator)/thiol group} is preferably 0.025 or more. With this, the adhesiveness and/or the airtight stickiness of the composition could improve. From this viewpoint, the ratio {(photoradical generator and thermal radical generator)/thiol group} is preferably 0.03 or more, more preferably 0.035 or more, and even more preferably 0.04 or more. Also from the viewpoint of improving the adhesiveness and/or the airtight stickiness of the composition, the ratio {(photoradical generator and thermal radical generator)/thiol group} is preferably 0.5 or less, more preferably 0.45 or less, even more preferably 0.4 or less.

As an optical component, a compound containing a carbon-carbon double bond may be incorporated in the composition. However, when the amount of the carbon-carbon double bond-containing compound incorporated is too large, then the polythiol compound (A) may react with the carbon-carbon double bond-containing compound. As a result, the thiol-ene reaction between the polythiol compound (A) and the carbon-carbon double bond in rubber would hardly occur, and therefore the adhesion force of the composition to rubber may lower. As the case may be, owing to the hydrogen drawing reaction from the carbon-carbon bond main chain of rubber by this, the reaction between the sulfur atom of the thiol group of the polythiol compound (A) and the carbon atom of the carbon-carbon bond could hardly occur so that the adhesion force of the composition to rubber may lower. Consequently, the ratio of the total molar number of the carbon-carbon double bond contained in the carbon-carbon double bond-containing compound to be incorporated, to the total molar number of the thiol group contained in the polythiol compound (A) to be incorporated (carbon-carbon double bond/thiol group) is preferably less than 0.4, more preferably less than 0.1, even more preferably 0.08 or less, still more preferably 0.05 or less, further more preferably 0.01 or less.

Here, the total molar number of the carbon-carbon double bond contained in the carbon-carbon double bond-containing compound to be incorporated may be calculated by multiplying the molar number of the compound to be incorporated by the number of the carbon-carbon double bonds that one molecule of the compound has.

The molar number ratio (carbon-carbon double bond/thiol group) may be calculated by dividing the total molar number of the carbon-carbon double bond, as measured in the manner as above, by the total molar number of the thiol group contained in the polythiol compound to be incorporated.

As described above, the composition in the present invention may contain any optional component in addition to the indispensable compounds (A) to (C). However, from the viewpoint of strongly adhering to rubber, especially vulcanized rubber, the total content of the components (A) to (C) in the composition is preferably 80% by mass or more, more preferably 90% by mass or more, even more preferably 95% by mass or more, still more preferably 98% by mass or more.

From the same viewpoint, the total content of the components (A) to (E) is preferably 90% by mass or more, more preferably 95% by mass or more, even more preferably 99% by mass or more, and further more preferably 100% by mass.

[Adhesive Agent and Coating Agent]

The adhesive agent and the coating agent in the present invention contain the above-mentioned composition. These adhesive agent and coating agents may contain any other component than the above-mentioned composition within a range not detracting from the object of the present invention. However, from the viewpoint of favorably expressing the advantageous effects of the present invention, the content of the composition in the adhesive agent or the coating agent is preferably 90% by mass or more, more preferably 95% by mass or more, even more preferably 99% by mass or more, and further more preferably 100% by mass.

[Adhesive Sheet and Coating Sheet]

The adhesive sheet and the coating sheet in the present invention are produced, using the above-mentioned composition.

The adhesive sheet and the coating sheet can be favorably obtained by applying the above-mentioned composition, or the above-mentioned adhesive agent or coating agent, onto a release sheet such as a release paper, a release film or the like and keeping the sheet form. Also the sheets may be obtained by applying the above-mentioned composition, or the above-mentioned adhesive agent or coating agent onto the surface of a member to be adhered, and keeping it thereon. It is considered that, during the keeping operation, at least a part of the thiol group and the isocyanate group in the composition could react through thiol-urethanation reaction to give a sheet form.

After the coating application, this is left at room temperature and, as a result, an adhesive sheet or a coating sheet could be favorably produced. Also, after the coating operation, this may be heated in such a manner that the radical reaction would not be started by the radical generator, thereby giving an adhesive sheet or a coating sheet.

From the above-mentioned viewpoints, the ambient temperature or the heating temperature of the adhesive sheet or the coating sheet is preferably from −30 to 60° C., more preferably from −20 to 40° C., even more preferably from 0 to 40° C., especially preferably from 15 to 40° C. The standing time (storing time) may be controlled by the amount of the urethanation catalyst. From the viewpoint of securing good operability in sheet formation and securing good maintenance of the sheet form during adhesion operation, the time is preferably 1 minute or more, more preferably 3 minutes or more, even more preferably 30 minutes or more, and still more preferably 60 minutes or more.

For keeping the sheet form of the coating sheet, it is desirable that, after the coating sheet has been formed, it is left in air at 0 to 60° C. for 1 minute or more, and thereafter the coating sheet is adhered to at least a part of the surface of a rubber article. This embodiment enables easy handling of the coating sheet and improves the adhering operation. The standing temperature is preferably from 5 to 40° C., more preferably from 15 to 40° C. The standing time may be controlled by the amount of the urethanation catalyst. From the viewpoint securing good operability in sheet formation and securing good maintenance of the sheet form during adhesion operation, the time is preferably 1 minute or more, more preferably 3 minutes or more. The upper limit of the standing time is not specifically defined. From the viewpoint of storage, the time is preferably 24 hours or less, more preferably 10 hours or less, even more preferably 5 hours or less.

After formed, if desired, the coating sheet may be heated to such a degree that the radical reaction by the radical generator would not occur by the heating, or may be photoirradiated to such a degree that the radical reaction by all the radical generator would not finish through the photoirradiation, to thereby provide the intended coating sheet. For example, the coating sheet may be preheated at 65 to 100° C. for 1 to 3 minutes or so, and then the sheet may be stuck to at least a part of the surface of a rubber article.

After coated but before left as such or heated, the total thickness of the release sheet and the composition thereon may be suitably selected depending on the object to be adhered, the desired adhesion strength, or the object to be coated or the desired adhesion force (coating strength), etc. The thickness of the adhesive sheet (excepting the site of the release sheet) is, for example, from 1 to 1000 μm, preferably from 10 to 300 μm, more preferably from 30 to 200 μm. The thickness of the coating sheet (excepting the site of the release sheet) is, for example, from 10 μm to 10 mm, preferably from 20 μm, to 10 mm, more preferably from 30 μm to 10 mm.

For use of the adhesive sheet, the adhesive sheet may be used after the release sheet has been released or during the release sheet is released. The same shall apply to the case of using the coating sheet.

The material of the release sheet is not specifically defined, for which, however, favorably usable here are transparent resin substrates comprising, as the main ingredient thereof, an organic resin, for example, a polyester resin such as polyethylene terephthalate, polycyclohexylene terephthalate, polyethylene naphthalate or the like, a polyamide resin such as nylon 46, modified nylon 6T, nylon MXD6, polyphthalamide or the like, a ketone resin such as polyphenylene sulfide, polythioether sulfone or the like, a sulfone resin such as polysulfone, polyether sulfone or the like, as well as polyether nitrile, polyarylate, polyether imide, polyamideimide, polycarbonate, polymethyl methacrylate, triacetyl cellulose, polystyrene, polyvinyl chloride or the like.

[Coating Material]

In the present invention, the coating material may be obtained through application of a coating composition to an adherend or through adhesion of a coating sheet to at least a part of the surface of a rubber particle. For producing the coating material, a coating composition is applied to at least a part of the surface of an adherend, and then the coating composition is subjected to at least any one of heating and photoirradiation, or the coating sheet is subjected to at least any one of heating and photoirradiation to give the coating material.

The surface of the coating material may be further coated with a top agent, a paint or the like for surface protection or decoration. The compound usable as the top agent, a paint or the like is not specifically defined, for which is usable any one having good adhesiveness to the coating material.

<Rubber>

In the present invention, rubber includes a rubber layer and a rubber article. The rubber including a rubber layer and a rubber article may be vulcanized rubber or unvulcanized rubber. According to the production method of the present invention, even when the rubber layer or the rubber article is an unvulcanized rubber layer or an unvulcanized rubber article, it may be strongly adhered to the adherend.

Preferably, the rubber including a rubber layer and a rubber article has a carbon-carbon double bond. In this case, it is presumed that the carbon atom of the carbon-carbon double bond that the rubber to be kept in contact with the adhesive or the adhesive sheet, or the carbon atom of the carbon-carbon double bond that the rubber article to be kept in contact with the coating agent or the coating sheet would form a carbon-sulfur bond with the sulfur atom of the thiol group in the polythiol compound (A) that the adhesive or the adhesive sheet or the coating agent or the coating sheet has.

However, even though the rubber including a rubber layer and a rubber article does not have a carbon-carbon double bond, it is still presumed that the intended laminate could be produced. In this case, it is presumed that, owing to the hydrogen drawing reaction from the carbon-carbon bond main chain existing in the rubber, by the polythiol compound (A), the sulfur atom of the thiol group in the polythiol compound (A) would chemically bond to the carbon atom of the carbon-carbon bond. However, from the viewpoint of improving the adhesion force or the airtight sticking force of the laminate, it is desirable that rubber including a rubber layer and a rubber article has a carbon-carbon double bond.

The shape of the rubber layer and the rubber article in the present invention is not specifically defined. The rubber layer may have any ordinary sheet form or thin film form, and the rubber article may be any one having a three-dimensional form, and may be one having a sheet form.

The rubber material for the rubber layer and the rubber article is not specifically defined. For example, as the rubber component, there are mentioned natural rubber; conjugated dienic synthetic rubber such as polyisoprene synthetic rubber (IR), polybutadiene rubber (BR), styrene-butadiene copolymer rubber (SBR), acrylonitrile-butadiene rubber (NBR), chloroprene rubber (CR), butyl rubber (IIR), halogenobutyl rubber (Cl-IIR, Br-IIR, etc.), etc.; as well as ethylene-propylene copolymer rubber (EPM), ethylene-propylene-diene copolymer rubber (EPDM), ethylene-butadiene copolymer rubber, propylene-butadiene copolymer rubber, polysiloxane rubber, etc. Of those, preferred are natural rubber and conjugated dienic synthetic rubber. Two or more different types of such rubber components may be combined for use herein.

<Adherend>

The adherend in the present invention may be any of rubber, metal or resin.

In case where the adherend is rubber, it may be the same material as that of rubber to which the composition is to be adhered, or may also be a different material.

Also in a case where the adherend is metal or resin, it strongly adheres to the above-mentioned adhesive. It is presumed that the thiol group acts as a base and could readily form a strong bond with a metal compound, and it is also presumed that the resin compound could form a bond through hydrogen-drawing reaction.

The composition, the coating agent or the coating sheet may also adhere to metal or resin, in addition to a rubber article, to form a composite. The composition, the coating agent and the coating sheet in the present invention can strongly adhere even to a metal surface and a resin surface.

[Bonded Body]

The present invention provided a bonded body mentioned below, according to the production method for a laminate that comprises a bonded body, and the bonded body is provided here as a laminate.

The bonded body in the present invention is a bonded body in which at least a part of at least two layers are bonded, and in which at least one layer is a rubber layer and at least one layer of the rubber layer is adhered to the adjacent layer via the adhesive or the adhesive sheet.

For the method of adhering the layer to the adjacent layer via the adhesive or the adhesive sheet, referred to is the production method for the bonded body.

The plural layers may be all rubber layers, or may contain any other layer than a rubber layer (for example, metal layer, resin layer, etc.).

The dimension of each layer and the number of the layers may be suitably selected depending on the intended object.

The rubber to constitute the rubber layer is the same as that described hereinabove. The other layer than the rubber layer includes a metal layer and a resin layer as described above.

[Composite]

The composite comprises the above-mentioned coating composition adhering to at least a part of the surface of an adherend.

<Rubber Composite>

In case where the adherend is a rubber article, a composite comprising the above-mentioned coating material adhering to at least a part of the surface of the adherend is referred to as a rubber composite. The rubber composite in the present invention comprises the above-mentioned composition, coating agent or coating sheet adhering to at least a part of the surface of a rubber article. The thickness of the coating agent or the thickness of the coating sheet may be suitably selected depending on the intended purpose.

The production method for the laminate in the present invention includes two embodiments of the production method for a laminate that comprises a bonded body of rubber and an adherend, and two embodiments of the production method for a laminate that comprises a coating material and a rubber article, or that is, four embodiments in total.

In the production method for the laminate that comprises a bonded body or rubber and an adherend in the present invention, the above-mentioned adhesive may be used directly as it is, or the above-mentioned adhesive sheet may also be used. Concretely, the following two embodiments are mentioned here.

(1) A method for producing a laminate that comprises a bonded body of rubber and an adherend, the method comprising applying an adhesive that contains a composition prepared by blending a polythiol compound (A), an isocyanate group-containing compound (B) and a radical generator (C), in which the ratio of the total molar number of the isocyanate group contained in the isocyanate-containing compound (B) to the total molar number of the thiol group contained in the polythiol compound (A) (isocyanate group/thiol group) is from 0.2 to 0.78, to at least one of rubber and an adherend to give a layered body of the rubber and the adherend via the applied adhesive therebetween, and then subjecting the layered body to at least one of heating and photoirradiation.

(2) A method for producing a laminate that comprises a bonded body of rubber and an adherend, the method comprising forming an adhesive sheet that contains a polythiol compound (A), an isocyanate group-containing compound (B) and a radical generator (C), in which the ratio of the total molar number of the isocyanate group contained in the isocyanate-containing compound (B) to the total molar number of the thiol group contained in the polythiol compound (A) (isocyanate group/thiol group) is from 0.2 to 0.78, then layering rubber and an adherend via the adhesive sheet to prepare a layered body, and thereafter subjecting the layered body to at least one of heating and photoirradiation.

Here, "layered body" is a structure in which the adhesive or the adhesive sheet is sandwiched between rubber and the adherend therein, and in which the adhesive or the adhesive sheet is not as yet subjected to heating or photoirradiation. The adhesive or the adhesive sheet is kept in contact with both at least a part of rubber and at least a part of the adherend. On the other hand, "bonded body" is a structure obtained after at least one process of heating or photoirradiation of the layered body.

As described above, in any of the layered body and the bonded body, the adhesive or the adhesive sheet may be kept in contact with at least a part of rubber and at least a part of the adherend, and in this, the contact mode is not specifically defined.

Of the above-mentioned (1) and (2) where the adhesive or the adhesive sheet is more adhesive to rubber or where the adhesive or the adhesive sheet is more adhesive to the adherend, preferred is the production method (1) from the viewpoint of the adhesion force.

<Production Method for Laminate of Bonded Body of Rubber and Adherend (Using Adhesive)>

Next described is a production method for a laminate that comprises a bonded body of rubber and an adherend using an adhesive.

The laminate of the present invention can be favorably obtained by adhering the adjacent layers with the adhesive in the present invention.

For example, first, an adhesive is applied to a rubber layer or to the adherend to face to a rubber layer. Next, if desired, the resultant structure is kept as such for a given period of time, an adherend, or that is, a layer except a rubber layer to face the rubber layer or the rubber layer is brought into contact with the adhesive-coated surface to give a layered body. In this step, the adhesive may be applied to both the layer except a rubber layer to face the rubber layer and the rubber layer. That is, the adhesive may be applied to any one of the two surfaces to face to each other, or the adhesive may be applied to both the two. Next, optionally while given a pressure in the thickness direction thereof, the layered body is cured to give a laminate in a preferred mode.

In the case where the layered body is kept standing as such for a given period of time after adhesive application, the standing time is preferably from 0 to 30 minutes, more preferably from 1 to 15 minutes from the viewpoint that the form of the adhesive is kept as such without leaking out from the layered body during curing.

In the case where the layered body is given a pressure, the pressure is preferably from 0 to 5 MPa, more preferably from 0 to 2.5 MPa, even more preferably from 0 to 1 MPa, from the viewpoint of improving the adhesion force of the resultant body and from the viewpoint of preventing or retarding the adhesive from leaking out of the laminate. Also from the same viewpoints, the pressing time is preferably from 5 to 120 minutes, more preferably from 10 to 60 minutes, even more preferably from 15 to 45 minutes.

In case where the adhesive contains a thermal radical generator as a type of radical generator therein, preferably, the body is cured by heating. As the heating temperature, a temperature at which the thermal radical generator could efficiently generate radicals may be suitably selected, and the temperature is preferably around the one-minute half-life temperature of the thermal radical generator±30° C.

In case where the adhesive contains a photoradical generator as a type of radical generator therein, preferably, the body is cured by photoirradiation. From the viewpoint of improving the adhesion force of the resultant body and from the viewpoint of cost reduction, the light source to be used is preferably at least one selected from electromagnetic waves such as UV rays, visible rays, IR rays, X rays, etc.; and corpuscular beams such as α rays, γ rays, electron rays, etc. More preferred is use of a UV lamp. Also from the same viewpoints, the photoirradiation time is preferably from a few seconds to several tens of seconds, more preferably from 1 to 40 seconds, even more preferably from 3 to 20 seconds.

The fact that a strong adhesion force can be realized even in the case where the body is cured by heating is advantageous in that the heating method can be employed even in a case where sufficient photoirradiation to the adhesive is difficult.

<Production Method for Laminate of Bonded Body of Rubber and Adherend (Using Adhesive Sheet)>

Next described is a production method for a laminate using an adhesive sheet.

The laminate of the present invention can be favorably obtained by adhering the adjacent layers with the adhesive sheet in the present invention. The layered body of rubber and an adherend may be one obtained using one adhesive sheet, or using two or more adhesive sheets.

From the viewpoint of the cost and the operability of the method, preferred is using one or two adhesive sheets. In particular, in a case where an adhesive sheet (A) having better adhesiveness to rubber and an adhesive sheet (B) having better adhesiveness to an adherend are favorably used, it is desirable that the layered body comprises the two adhesive sheets.

For example, first, one or more adhesive sheets are put between adjacent layers to give a layered body. For example, an adhesive sheet is put between at least one rubber layer and a layer to face that rubber layer (rubber layer or any other layer than rubber layer) to prepare a layered body. Next, optionally while given a pressure in the thickness direction thereof, the layered body is cured to give a laminate in a preferred mode.

In the case where the layered body is given a pressure, the pressure is preferably from 0.1 to 5 MPa, more preferably from 0.2 to 4.0 MPa, even more preferably from 0.3 to 3.0 MPa, still more preferably from 0.4 to 3.0 MPa, further more preferably from 0.5 to 3.0 MPa, from the viewpoint of improving the adhesion force of the resultant body. The other pressing condition (pressing time) than this and the curing condition (heating temperature, heating time, light source, photoirradiation time) are the same as those in the above-mentioned case of using the adhesive.

In any operation of heating and photoirradiation, the site to be heated and the site to be given photoirradiation are not specifically defined so far as heat energy or optical energy is transmitted to the adhesive sheet. Any site of the layered body may be heated or photoirradiated. In other words, the adhesive sheet may be directly heated or photoirradiated, or the adhesive sheet may be heated or photoirradiated via rubber and/or adherend.

As described above, even in the case where the body is cured by heating, a strong adhesion force is given to the resultant body, and this is advantageous in that a heating method can be employed even in a case where sufficient photoirradiation to the adhesive is difficult, and is additionally favorable in point of easy operation since any site of the layered body can be heated and/or photoirradiated to realize strong adhesion.

In the production method for the laminate that comprises a rubber composite of a coating material and a rubber article in the present invention, the coating agent comprising the composition may be used directly as it is, or a coating sheet formed of the composition may be used. Concretely, the method includes the following two embodiments.

(1) A method for producing a rubber composite (laminate) that comprises a coating material and a rubber article, the method comprising adhering a coating agent that contains a composition prepared by blending a polythiol compound (A), an isocyanate group-containing compound (B) and a radical generator (C), in which the ratio of the total molar number of the isocyanate group contained in the isocyanate-containing compound (B) to the total molar number of the thiol group contained in the polythiol compound (A) (isocyanate group/thiol group) is from 0.20 to 0.78, to at least a part of the surface of a rubber article and then subjecting the coating agent to at least one of heating and photoirradiation to form a coating material.

(2) A method for producing a rubber composite (laminate) that comprises a coating material and a rubber article, the method comprising forming a coating sheet that comprises a coating agent containing a composition prepared by blending a polythiol compound (A), an isocyanate group-containing compound (B) and a radical generator (C), in which the ratio of the total molar number of the isocyanate group contained in the isocyanate-containing compound (B) to the total molar number of the thiol group contained in the polythiol compound (A) (isocyanate group/thiol group) is from 0.20 to 0.78, then adhering the coating sheet to at least a part of the surface of a rubber article, and thereafter subjecting the coating sheet to at least one of heating and photoirradiation to form a coating material.

Here, "coating material" is one obtained by applying a coating agent to at least a part of the surface of a rubber article, and then subjecting it to at least one of heating and photoirradiation, or is one obtained by adhering a coating sheet to at least a part of the surface of a rubber article, and then subjecting it to at least one of heating and photoirradiation.

<Production Method for Laminate of Rubber Composite of Coating Material and Rubber Article (Using Coating Agent)>

Next described is a production method for a laminate that comprises a bonded body of rubber and an adherend using a coating agent.

The laminate of the present invention can be favorably obtained by applying and adhering a coating agent that contains the above-mentioned composition to at least a part of the surface of a rubber article.

Coating with the coating agent is attained according to the coating method to be mentioned below. If desired, the coated structure is kept standing as such for a given period of time after the application of a coating agent thereto. In this case, the standing time is preferably from 0 to 30 minutes, more preferably from 1 to 15 minutes from the viewpoint that the form of the coating composition is kept as such without leaking out from the composite during curing.

In the case where the rubber composite that comprises the coating material and the rubber article, in which the coating material is formed by applying and adhering a coating agent to at least a part of the surface of a rubber article, is given a pressure, the pressure is preferably from 0 to 5 MPa, more preferably from 0 to 2.5 MPa, even more preferably from 0 to 1 MPa, from the viewpoint of improving the adhesion force of the composite and from the viewpoint of preventing or retarding the coating agent from leaking out of the laminate. Also from the same viewpoints, the pressing time is preferably from 5 to 120 minutes, more preferably from 10 to 60 minutes, even more preferably from 15 to 45 minutes.

<Production Method for Laminate of Rubber Composite of Coating Material and Rubber Article (Using Coating Sheet)>

Next described is a production method for a laminate using a coating sheet.

In the case of using a coating sheet, the rubber composite comprising a coating material and a rubber article may have one coating sheet between the constituent components, but may have two or more coating sheets therebetween. From the viewpoint of the cost and the operability of the method, preferred is using one or two coating sheets. In particular, in a case where a coating sheet having better adhesiveness to rubber and a coating sheet having better adhesiveness to an adherend are favorably used, it is desirable that the composite comprises the two coating sheets.

In a case where the layered body of rubber and an adherend arranged via a coating sheet put therebetween is given a pressure, the pressure is preferably from 0.1 to 5 MPa, more preferably from 0.4 to 4 MPa, even more preferably from 0.5 to 3 MPa, still more preferably from 1.5 to 3 MPa, from the viewpoint of improving the adhesion force of the resultant body. The pressing time is the same as in the case of using a coating agent described hereinabove.

In a case where the coating agent contains a photoradical generator as a type of radical generator therein, preferably, the composite is cured by photoirradiation. As the light, preferred is use of at least one selected from electromagnetic waves such as UV rays, visible rays, IR rays, X rays, etc.; and corpuscular beams such as $\alpha$ rays, $\gamma$ rays, electron rays, etc. More preferred is use of UV rays as the light. From the viewpoint of adhesion force enhancement and cost reduction, a UV lamp is preferred as the light source. Also from the same viewpoints, the photoirradiation time is preferably from a few seconds to several tens of seconds, more preferably from 1 to 40 seconds, even more preferably from 3 to 20 seconds.

In a case where the coating agent contains a thermal radical generator as a type of radical generator therein, preferably, the composite is cured by heating. As the heating temperature, a temperature at which the thermal radical generator could efficiently generate radicals may be suitably selected, and the temperature is preferably around the one-minute half-life temperature of the thermal radical generator$\pm 30°$ C.

In any operation of heating or photoirradiation, the site to be photoirradiated and/or and the site to be heated are not specifically defined so far as optical energy and/or heat energy is transmitted to the coating agent. Any site of the layered body may be photoirradiated and/or heated. In other words, the coating agent may be directly photoirradiated and/or heated, or the coating agent may be photoirradiated and/or heated via the rubber article. This is because some type of the rubber article may transmit light.

The fact that a strong adhesion force can be realized even in the case where the composite is cured by heating is advantageous in that the heating method can be employed even in a case where sufficient photoirradiation to the coating agent is difficult, and is additionally favorable in point of easy operation since any site of the layered body can be heated and/or photoirradiated to realize strong adhesion.

In any operation of heating or photoirradiation, the site to be photoirradiated and/or and the site to be heated are not specifically defined so far as optical energy and/or heat energy is transmitted to the coating sheet. Any site of the layered body may be photoirradiated and/or heated. In other words, the coating sheet may be directly photoirradiated and/or heated, or the coating sheet may be photoirradiated and/or heated via the rubber article.

As described above, the fact that a strong adhesion force can be realized even in the case where the composite is cured by heating is advantageous in that the heating method can be employed even in a case where sufficient photoirradiation to the coating agent is difficult, and is additionally favorable in point of easy operation since any site of the coating material can be heated and/or photoirradiated to realize strong adhesion.

(Coating Method)

In the present invention where the coating agent is applied to at least a part of the surface of a rubber article, or where the coating agent is applied to a release sheet or the like to form a coating sheet, the coating method is not specifically defined. For example, the coating method employable here includes various types of coating methods of a hand-work or machine-assisted coating method of brush coating, roller-brush coating, French polishing, spatula coating or the like; a coating method of inkjet printing; a spray-coating method of spray coating, hot spray coating, airless spray coating, hot airless spray coating or the like; a curtain flow coating method, a flow coating method; a roll coating method; a gravure coating method; a dipping method; a drum coating method; a spin coating method; a reverse coating method; a bar coating method; a screen coating method; a blade coating method; an air knife coating method; a dispensing coating method with a dispenser; a T-die molding method; a thin film extrusion molding method; etc.

[Application Examples with Adhesive or Coating Agent in Invention]

Preferred application examples with the composition, the adhesive, the adhesive sheet, the coating agent, the coating sheet or the laminate in the present invention are shown below; however, the present invention is not limited to these application examples.

The composition, the adhesive, the adhesive sheet, the coating agent, the coating sheet and the laminate in the present invention are applicable to techniques relating to printing on tires, concretely to decorative and protective materials for tire surfaces. Using these improves the airtight sticking and adhesion between decorative and protective materials and tire surfaces.

The composition and the adhesive in the present invention are usable as an adhesive between a tread and a base tire in retreading (tread regeneration) of tires, especially tires for airplanes. Using these prevents sulfur transfer from a cushion rubber that has heretofore been used as an adhesive to a base tire and prevents sulfur transfer from a tread to a base tire.

Further, in producing retreaded tires, the composition, the adhesive, the adhesive sheet and the laminate in the present invention can be used. Using these improves the adhesiveness between a tread and a base tire.

In addition, the composition and the adhesive in the present invention are applicable to pneumatic tires having, on both sides of the tire, a pump mechanism-having plug.

The plug is attached to the hole formed on the side of a tire. The plug includes a first plug that plugs the inner opening of the hole formed in a tire, a second plug that plugs the outer opening of the hole formed in the tire, cavities formed inside the first and second plugs, a check valve-equipped first passage via which the cavity and the space inside the tire are communicated with each other, a check valve-equipped second passage via which the cavity and the space outside the tire are communicated with each other, and an elastic body provided inside the cavity. In an ordinary running state of the pneumatic tire, a compressive force acts on the plug in the radical direction of the tire; while in a running state thereof given a high load, a tensile force acts on the plug in the radical direction of the tire. The elastic body is compressed when the pug is given a compressive force, and the air inside the cavity is compressed and this is supplied to the inside area of the tire. When the plug is given a tensile force, the elastic body expands so that air flows into the cavity from the outside area of the tire. For example, the composition in the present invention may be used as a material for the first plug and the second plug. In addition, the adhesive in the present invention may be used in adhering the first plug and the second plug to the hole formed in the side of a tire.

The composition, the adhesive and the adhesive sheet in the present invention may be used for vulcanization adhesion between an unvulcanized side rubber and a steel cord-reinforcing layer in adhering the side rubber-reinforcing layers of a tire. Using these reduces fluctuation in adhesion strength and reduces material loss.

The composition, the adhesive, the adhesive sheet and the laminate in the present invention can be used for repairing a punctured site of off-the-road tires (tires for mine vehicles or tires for construction vehicles). For example, in repairing an off-the-road tire with vulcanized rubber, the punctured site and the vulcanized rubber may be adhered with the composition, the adhesive or the adhesive sheet in the present invention to repair the site.

The composition, the coating agent and the coating sheet in the present invention favorably adheres to an adherend, especially to a vulcanized rubber article to provide a rubber composite, and are therefore usable for coating for rubber composite laminates, especially for tires and various industrial rubber components, for example, rubber hoses, rubber vibration insulators, rubber belts, rubber dams, belt conveyors, packings, etc.

EXAMPLES

The present invention is described in more detail with reference to Examples given below; however, the present invention is not whatsoever limited to the following Examples.

[Source Materials and Others]

As the source materials and others, the following were used.

<Polythiol Compound (A) (component (A))>

Pentaerythritol tetrakis(3-mercaptopropionate) (PEMP): manufactured by SC Organic Chemical Co., Ltd., having 4 thiol groups.

Dipentaerythritol hexakis(3-mercaptopropionate) (DPMP): manufactured by SC Organic Chemical Co., Ltd., having 6 thiol groups.

Tris-[(3-mercaptopropionyloxy)-ethyl]isocyanurate (TEMPIC); manufactured by SC Organic Chemical Co., Ltd., trade name "TEMPIC", having 3 thiol groups.

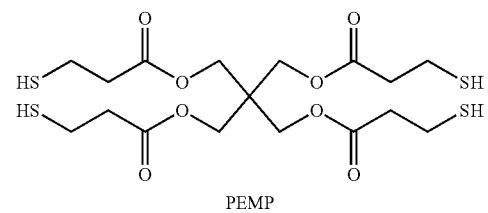

PEMP

-continued

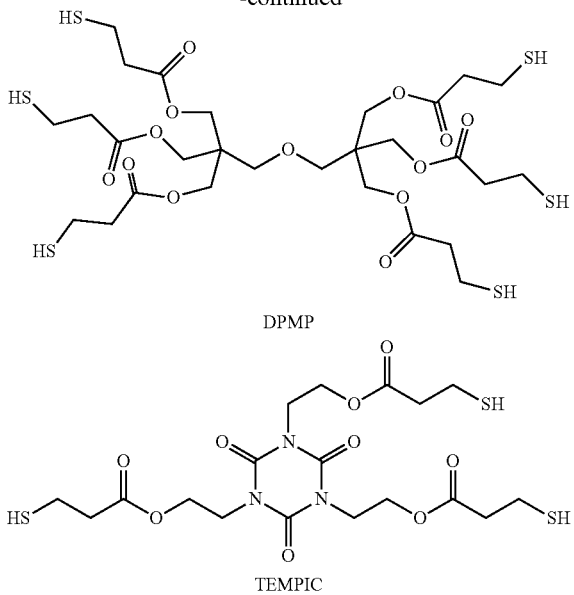

DPMP

TEMPIC

<Isocyanate Group-Containing Compound (B) (component (B))>

HDI burette-modified isocyanate: manufacture by Sumitomo Bayer Urethane Co., Ltd., trade name "Desmodur N3200", having NCO content of 23.0%.

HDI isocyanurate-modified isocyanate: manufacture by Nippon Polyurethane Industry Co., Ltd., trade name "Coronate HXLV", having NCO content of 23.2%.

IPDI isocyanurate-modified isocyanate: manufacture by Sumitomo Bayer Urethane Co., Ltd., trade name "Desmodur Z4470BA", having NCO content of 11.9%.

IPDI allophanate-modified isocyanate: manufacture by Sumitomo Bayer Urethane Co., Ltd., trade name "Desmodur XP2565", having NCO content of 12.0%.

TDI TMP adduct-modified isocyanate: manufacture by Sumitomo Bayer Urethane Co., Ltd., trade name "Desmodur L75(C)", having NCO content of 13.3%.

TDI isocyanurate-modified isocyanate: manufacture by Mitsui Chemical Polyurethanes, Inc., trade name "D-204", having NCO content of 7.5%.

XDI TMP adduct-modified isocyanate: manufacture by Mitsui Chemical Polyurethanes, Inc., trade name "D-110N", having NCO content of 11.5%.

$H_6$XDI TMP adduct-modified isocyanate: manufacture by Mitsui Chemical Polyurethanes, Inc., trade name "D-120N", having NCO content of 11.0%.

$H_6$XDI isocyanurate-modified isocyanate: manufacture by Mitsui Chemical Polyurethanes, Inc., trade name "D-127N", having NCO content of 13.5%.

IPDI: manufactured by Evonik Degussa Japan Co., Ltd. trade name "VESTANAT IPDI", having functional group equivalent of 111 and NCO content of 37.6%.

<Radical Generator (C) (component (C))> t-Butyl 2-ethylperoxyhexanoate: manufactured by NOF Corporation, trade name "Perbutyl O".

Dilauroyl peroxide: manufactured by NOF Corporation, trade name "Perloyl L".

1,1,3,3-Tetramethylbutylperoxy 2-ethylhexanoate: manufactured by NOF Corporation, trade name "Perocta O".

1,1-Di(t-hexylperoxy)cyclohexanone: manufactured by NOF Corporation, trade name "Perhexa HC".

Di-t-butyl peroxide: manufactured by NOF Corporation, trade name "Perbutyl D".

T-butylcumyl peroxide: manufactured by NOF Corporation, trade name "Perbutyl C".

<Urethanation Catalyst (D) (component (D))>

Triethylenediamine (TEDA): manufactured by Air Products and Chemicals, Inc., trade name "DABCO 33LV catalyst".

<Surface Conditioner (E) (component (E))>

BYK-307: mixture of polyether-modified polydimethylsiloxane and polyether: manufactured by BYK Japan KK, trade name "BYK-307", content 100%.

[Measurement of Number of Thiol Groups]

The total molar number of the thiol group contained in the polythiol compound (A) to be incorporated is determined through calculation of dividing the incorporated amount of the compound by the theoretical molecular weight thereof followed by multiplying the resultant value by the number of the thiol groups that one molecule of the polythiol compound (A) has.

[Measurement of Number of Isocyanate Groups]

The total molar number of the isocyanate group contained in the isocyanate group-containing compound (B) to be incorporated is determined according to the method B in JIS K1603-1.

[Production of Rubber Article]

According to the compounding recipe shown in Table 1 below, rubber members or rubber articles (100 mm in length×25 mm in width×10 mm in thickness) were produced.

The components were blended as in Table 1 below, and the resulting mixture was rolled into a sheet having a size of 150 mm in length×270 mm in width×3.4 mm in thickness. Three these sheets were layered, and vulcanized in a mold having a size of 150 mm in length×270 mm in width×10 mm in thickness at 150° C. for 45 minutes. The vulcanized body was cut into pieces each having a length of 100 mm and a width of 25 mm to be samples for tensile test.

TABLE 1

| | | Type of Rubber | | | | | |
|---|---|---|---|---|---|---|---|
| | | NR/BR | NR/SBR | SBR | NR/SBR/BR | NR/IR | NR |
| Compounding Formulation | NR | 50 | 50 | — | 40 | 50 | 100 |
| | BR | 50 | — | — | 30 | — | — |
| | SBR | — | 50 | 100 | 30 | — | — |
| | IR | — | — | — | — | 50 | — |
| | Carbon Black | 50 | 50 | 50 | 50 | 50 | 50 |
| | Stearic Acid | 2 | 2 | 2 | 2 | 2 | 2 |
| | Antiaging Agent | 1 | 1 | 1 | 1 | 1 | 1 |
| | Zinc oxide | 3 | 3 | 3 | 3 | 3 | 3 |
| | Vulcanization Accelerator 1 | 0.4 | 0.4 | 0.4 | 0.4 | 0.4 | 0.4 |
| | Vulcanization Accelerator 2 | 0.2 | 0.2 | 0.2 | 0.2 | 0.2 | 0.2 |
| | Sulfur | 1.4 | 1.4 | 1.4 | 1.4 | 1.4 | 1.4 |

* The numerical value in Table is part by mass.

The details of the components in Table 1 are as follows:

Natural rubber (NR): RSS#3.

Polybutadiene rubber (BR): manufactured by JSR Corporation, trade name "JSR BRO1".

Styrene-butadiene copolymer rubber (SBR): manufactured by JSR Corporation, trade name "JSR 1500".

Polyisoprene synthetic rubber (IR): manufactured by JSR Corporation, trade name "JSR IR2200".

Carbon black: manufactured by Asahi Carbon Co., Ltd., trade name "Asahi #70".

Antiaging agent: N-phenyl-N'(1,3-dimethylbutyl)-p-phenylenediamine, manufactured by Ouchi Shinko Chemical Industrial Co., Ltd., trade name "Nocrac 6C".

Vulcanization accelerator 1: 1,3-diphenylguanidine, manufactured by Ouchi Shinko Chemical Industrial Co., Ltd., trade name "Nocceler D (D-P)".

Vulcanization accelerator 2: di-2-benzothiazolyl disulfide, manufactured by Ouchi Shinko Chemical Industrial Co., Ltd., trade name "Nocceler DM-P (DM)".
(Steel Plate)

As a steel plate, used here was "SPCC-SD" (model number) manufactured by Test Piece Co., Ltd.

[Method for Measurement of Adhesion Force of Cured Adhesive]

The adhesive was applied to two rubber members to be in a thickness of 30 μm thereon, and the coated surfaces were stuck together and cured. For curing them, the two members were kept under a pressure of 0.05 MPa at a temperature of 150° C. for 30 minutes. The rubber members were peeled in the direction of 180 degrees at a pulling rate of 50 mm/min to determine the peeling strength (N/25 mm) as an index of the adhesion thereof.

[Method for Measurement of Adhesion Force of Cured Adhesive Sheet]

The adhesive sheet having a thickness of 30 μm was sandwiched between rubber members and cured. For curing it, the sheet was kept as such while pressed under a pressure of 2.5 MPa at a temperature of 150° C. for 30 minutes. The rubber members were peeled in the direction of 180 degrees at a pulling rate of 50 mm/min to determine the peeling strength (N/25 mm) as an index of the adhesion thereof.

Regarding the value of the adhesion force, the force of 100 N/25 mm or more means a sufficient adhesion force on a level of breakage of the rubber substrate. The adhesive force is preferably 300 N/25 mm or more. On the other hand, the force less than 100 N/25 mm means that the reaction between the substrate and the adhesive is insufficient so that the two are in a state of peeling at the interface therebetween, or means that the cohesion force of the adhesive is insufficient so that the adhesive itself is under cohesion failure. In those states, it could not be said that the adhesion force would be sufficient.

Examples 1 to 7 and Comparative Examples 1 to 9, and Examples 8 to 14 and Comparative Examples 10 to 18

In Examples 1 to 7 and Comparative Examples 1 to 9 (adhesive), the ratio of the total molar number of the isocyanate group contained in the isocyanate group-containing compound (B) to be incorporated to the total molar ratio of the thiol group contained in the polythiol compound (A) to be incorporated (isocyanate group/thiol group) was varied, and the relationship between the ratio (isocyanate group/thiol group) and the adhesion force was investigated.

In Examples 8 to 14 and Comparative Examples 10 to 18 (adhesive sheet), the relationship between the ratio (isocyanate group/thiol group) and the adhesion force was investigated in the same manner as in the above-mentioned Examples 1 to 7 and Comparative Examples 1 to 9 (adhesive) except that the adhesive sheet was used in place of the adhesive.

Next, these Examples and Comparative Examples are described concretely.

Examples 1 to 7, Comparative Examples 1 to 9 (Adhesive)

The components were formulated as shown in Table 2 below (in which the numerical value of each component means part by mass) to give a composition, and the composition was used as an adhesive.

The resultant adhesive was cured in the manner as above, and the adhesion force of the cured adhesive was measured in the manner as above. As the rubber member, used was NR/BR. The results are shown in Table 3.

In Table 2 as well as Table 4, Table 6, Table 8, Table 10 and Table 12, the thiol functional group concentration means the concentration of the thiol group (mmol/g) in the total amount of the constitutive components of the adhesive or the adhesive sheet. The NCO functional group concentration means the concentration of the isocyanate group (mmol/g) in the total amount of the constitutive components of the adhesive or the adhesive sheet. Further, the generator concentration means the concentration of the radical generator (mmol/g) in the total amount of the constitutive components of the adhesive or the adhesive sheet. In these, the constitutive components may mutually react with each other or may decompose, and therefore, the value is one calculated before such reaction or decomposition of the constitutive components, or that is, the value is the theoretical value calculated from the amount of each constitutive component just before actually compounded.

Examples 8 to 14, Comparative Examples 10 to 18 (Adhesive Sheet)

As shown in Table 2, in Examples 8 to 14 and Comparative Examples 10 to 18, the same adhesives as those in Examples 1 to 7 and Comparative Examples 1 to 9, respectively, were prepared.

The adhesive was applied onto a PET-made release sheet, and kept at room temperature for 30 minutes to produce an adhesive sheet having a length of 100 mm, a width of 25 mm and a thickness of 30 μm.

The resultant adhesive sheet was cured in the manner as above, and also in the manner as above, the adhesion force of the cured adhesive sheet was measured. As the rubber member, NR/BR was used like in Example 1. The results are shown in Table 3.

Examples 15 to 20 and Comparative Example 19, and Examples 21 to 26 and Comparative Example 20

In Examples 15 to 20 and Comparative Example 19 (adhesive), the ratio of the total molar number of the radical generator (C) to be incorporated to the total molar ratio of the thiol group contained in the polythiol compound (A) to be incorporated mainly (radical generator (C)/thiol group) was varied, and the relationship between the ratio (radical generator (C)/thiol group) and the adhesion force was investigated.

In Examples 21 to 26 and Comparative Example 20 (adhesive sheet), the relationship between the ratio (radical generator (C)/thiol group) and the adhesion force was investigated in the same manner as in the above-mentioned Examples 15 to 20 and Comparative Example 19 (adhesive) except that the adhesive sheet was used in place of the adhesive.

Next, these Examples and Comparative Examples are described concretely.

Examples 15 to 20 and Comparative Example 19

The same operation as in Example 1 was carried out except that the formulations were changed to those in Table 4. The results are shown in Table 5.

Examples 21 to 26 and Comparative Example 20

The same operation as in Example 8 was carried out except that the formulations were changed to those in Table 4. The results are shown in Table 5.

Examples 27 to 32 and Examples 33 to 38

In Examples 27 to 32 (adhesive), the type of rubber being the object to be adhered was varied, and the relationship between the type of rubber being the object to be adhered and the adhesion force was investigated.

In Examples 33 to 38 (adhesive sheet), the relationship between the type of rubber to be the object to be adhered and the adhesion force was investigated in the same manner as in the above-mentioned Examples 27 to 32 (adhesive) except that the adhesive was changed to the adhesive sheet.

Next, these Examples are described concretely.

Examples 27 to 32

The same operation as in Example 1 was carried out except that the formulations were changed to those in Table 6 and the rubber member shown in Table 7 was used. The results are shown in Table 7.

Examples 33 to 38

The same operation as in Example 8 was carried out except that the formulations were changed to those in Table 6 and the rubber member shown in Table 7 was used. The results are shown in Table 7.

Examples 39 to 40 and Examples 41 to 42

In Examples 39 to 40 (adhesive), the type of the polythiol compound (A) to be incorporated was changed, and the relationship between the polythiol compound (A) and the adhesion force was investigated.

In Examples 41 to 42 (adhesive sheet), the relationship between the type of the polythiol compound (A) and the adhesion force was investigated in the same manner as in the above-mentioned Examples 39 to 40 (adhesive) except that the adhesive was changed to the adhesive sheet.

Next, these Examples are described concretely.

Examples 39 to 40 (Adhesive)

The same operation as in Example 1 was carried out except that the formulations were changed to those in Table 8 and the polythiol compound (A) shown in Table 9 was used. The results are shown in Table 9.

Examples 41 to 42 (Adhesive Sheet)

The same operation as in Example 8 was carried out except that the formulations were changed to those in Table 8 and the polythiol compound (A) shown in Table 9 was used. The results are shown in Table 9.

Examples 43 to 51 and Examples 52 to 60

In Examples 43 to 51 (adhesive), the type of the isocyanate group-containing compound (B) to be incorporated was changed, and the relationship between the isocyanate group-containing compound (B) and the adhesion force was investigated.

In Examples 52 to 60 (adhesive sheet), the relationship of the type of the isocyanate group-containing compound (B) was investigated in the same manner as in the above-mentioned Examples 43 to 51 (adhesive) except that the adhesive was changed to the adhesive sheet.

Next, these Examples are described concretely.

Examples 43 to 51 (Adhesive)

The same operation as in Example 1 was carried out except that the formulations were changed to those in Table 10 and the isocyanate group-containing compound (B) shown in Table 11 was used. The results are shown in Table 11.

Examples 52 to 60 (Adhesive Sheet)

The same operation as in Example 8 was carried out except that the formulations were changed to those in Table 10 and the isocyanate group-containing compound (B) shown in Table 11 was used. The results are shown in Table 11.

Examples 61 to 65 and Examples 66 to 70

In Examples 61 to 65 (adhesive), the type of the radical generator (C) to be incorporated was changed, and the relationship between the radical generator (C) and the adhesion force was investigated.

In Examples 66 to 70 (adhesive sheet), the relationship between the type of rubber which is an object to be adhered and the adhesion force was investigated in the same manner as in the above-mentioned Examples 61 to 65 (adhesive composition) except that the adhesive was changed to the adhesive sheet.

Next, these Examples are described concretely.

Examples 61 to 65 (Adhesive)

The same operation as in Example 1 was carried out except that the formulations were changed to those in Table 12 and the radical generator (C) shown in Table 13 was used. The results are shown in Table 13.

Examples 66 to 70 (Adhesive Sheet)

The same operation as in Example 8 was carried out except that the formulations were changed to those in Table 12 and the radical generator (C) shown in Table 13 was used. The results are shown in Table 13.

TABLE 2

| | | Formulation | | | | | | |
|---|---|---|---|---|---|---|---|---|
| | | Component (A) | | Component (B) | | Component (C) | Component (D) | Component (E) |
| Adhesive | Adhesive Sheet | PEMP (part by mass) | DPMP (part by mass) | N3200 (part by mass) | Z4470BA (part by mass) | Perbutyl O (part by mass) | TEDA (part by mass) | BYK-307 (part by mass) |
| Comparative Example 1 | Comparative Example 10 | 83.2 | — | — | — | 15.2 | 0.001 | 1.7 |
| Comparative Example 2 | Comparative Example 11 | 74.0 | — | 11.1 | — | 13.5 | 0.001 | 1.5 |
| Comparative Example 3 | Comparative Example 12 | — | 67.6 | 18.9 | — | 12.2 | 0.001 | 1.4 |
| Example 1 | Example 8 | — | 57.7 | — | 31.2 | 9.9 | 0.001 | 1.2 |
| Example 2 | Example 9 | — | 49.9 | — | 40.5 | 8.5 | 0.001 | 1 |
| Example 3 | Example 10 | 48.3 | — | — | 41.9 | 8.8 | 0.001 | 1 |
| Example 4 | Example 11 | 51.3 | — | 38.3 | — | 9.4 | 0.001 | 1 |
| Example 5 | Example 12 | 47.6 | — | 42.7 | — | 8.7 | 0.001 | 1 |
| Example 6 | Example 13 | 44.5 | — | 46.5 | — | 8.1 | 0.001 | 0.9 |
| Example 7 | Example 14 | 42.2 | — | 49.4 | — | 7.6 | 0.001 | 0.8 |
| Comparative Example 4 | Comparative Example 13 | 41.7 | — | 49.9 | — | 7.6 | 0.001 | 0.8 |
| Comparative Example 5 | Comparative Example 14 | — | 43.1 | 48.3 | — | 7.8 | 0.001 | 0.9 |
| Comparative Example 6 | Comparative Example 15 | 39.3 | — | 52.8 | — | 7.2 | 0.001 | 0.8 |
| Comparative Example 7 | Comparative Example 16 | 37.1 | — | 55.4 | — | 6.8 | 0.001 | 0.7 |
| Comparative Example 8 | Comparative Example 17 | 23.9 | — | 71.3 | — | 4.0 | 0.001 | 0.5 |
| Comparative Example 9 | Comparative Example 18 | — | — | 77.8 | — | 20.0 | 0.001 | 2.2 |

| Adhesive | Adhesive Sheet | Isocyanate Group/Thiol Group (molar ratio) | Component (C)/Thiol Group (molar ratio) | Thiol Functional Group Concentration (mmol/g) | NCO Functional Group Concentration (mmol/g) | Generator Concentration (mmol/g) |
|---|---|---|---|---|---|---|
| Comparative Example 1 | Comparative Example 10 | 0.0 | 0.10 | 6.80 | 0.00 | 0.70 |
| Comparative Example 2 | Comparative Example 11 | 0.1 | 0.10 | 6.05 | 0.61 | 0.62 |
| Comparative Example 3 | Comparative Example 12 | 0.15 | 0.10 | 5.17 | 1.03 | 0.56 |
| Example 1 | Example 8 | 0.2 | 0.10 | 4.42 | 0.88 | 0.46 |
| Example 2 | Example 9 | 0.3 | 0.10 | 3.83 | 1.15 | 0.39 |
| Example 3 | Example 10 | 0.4 | 0.10 | 4.00 | 1.20 | 0.40 |
| Example 4 | Example 11 | 0.5 | 0.10 | 4.20 | 2.10 | 0.43 |
| Example 5 | Example 12 | 0.6 | 0.10 | 3.90 | 2.34 | 0.40 |
| Example 6 | Example 13 | 0.7 | 0.10 | 3.64 | 2.55 | 0.38 |
| Example 7 | Example 14 | 0.78 | 0.10 | 3.45 | 2.70 | 0.35 |
| Comparative Example 4 | Comparative Example 13 | 0.8 | 0.10 | 3.41 | 2.73 | 0.35 |
| Comparative Example 5 | Comparative Example 14 | 0.8 | 0.10 | 3.30 | 2.64 | 0.36 |
| Comparative Example 6 | Comparative Example 15 | 0.9 | 0.10 | 3.21 | 2.89 | 0.33 |
| Comparative Example 7 | Comparative Example 16 | 1.0 | 0.10 | 3.03 | 3.03 | 0.31 |
| Comparative Example 8 | Comparative Example 17 | 2.0 | 0.10 | 1.95 | 3.91 | 0.20 |
| Comparative Example 9 | Comparative Example 18 | no thiol group | — | 0.00 | 4.26 | 0.92 |

TABLE 3

| Isocyanate Group/Thiol Group (molar ratio) | Adhesive | | | Adhesive Sheet | | |
|---|---|---|---|---|---|---|
| | | Adhesion Force (N/25 mm) | Remarks | | Adhesion Force (N/25 mm) | Remarks |
| 0 | Comparative Example 1 | 15 | not cured | Comparative Example 10 | — | not cured |

TABLE 3-continued

| Isocyanate Group/Thiol Group (molar ratio) | Adhesive | Adhesion Force (N/25 mm) | Remarks — | Adhesive Sheet | Adhesion Force (N/25 mm) | Remarks — |
|---|---|---|---|---|---|---|
| 0.1 | Comparative Example 2 | 15 | not cured | Comparative Example 11 | — | not cured |
| 0.15 | Comparative Example 3 | 91 | — | Comparative Example 12 | 95 | — |
| 0.2 | Example 1 | 160 | — | Example 8 | 155 | — |
| 0.3 | Example 2 | 189 | — | Example 9 | 203 | — |
| 0.4 | Example 3 | 225 | — | Example 10 | 325 | — |
| 0.5 | Example 4 | 883 | — | Example 11 | 929 | — |
| 0.6 | Example 5 | 589 | — | Example 12 | 818 | — |
| 0.7 | Example 6 | 669 | — | Example 13 | 752 | — |
| 0.78 | Example 7 | 150 | — | Example 14 | 210 | — |
| 0.8 | Comparative Example 4 | 19 | — | Comparative Example 13 | 84 | — |
| 0.8 | Comparative Example 5 | 92 | — | Comparative Example 14 | 94 | — |
| 0.9 | Comparative Example 6 | 18 | — | Comparative Example 15 | 46 | — |
| 1 | Comparative Example 7 | 15 | — | Comparative Example 16 | 48 | — |
| 2 | Comparative Example 8 | 15 | — | Comparative Example 17 | 46 | — |
| no thiol group | Comparative Example 9 | 14 | not cured | Comparative Example 18 | — | not cured |

TABLE 4

| | | Formulation | | | | | |
|---|---|---|---|---|---|---|---|
| | | Component (A) | | Component (B) | Component (C) | Component (D) | Component (E) |
| Adhesive | Adhesive Sheet | PEMP (part by mass) | DPMP (part by mass) | N3200 (part by mass) | Perbutyl O (part by mass) | TEDA (part by mass) | BYK-307 (part by mass) |
| Comparative Example 19 | Comparative Example 20 | 56.6 | — | 42.3 | — | 0.001 | 1.1 |
| Example 15 | Example 21 | 56.0 | — | 41.8 | 1 | 0.001 | 1.1 |
| Example 16 | Example 22 | 53.8 | — | 40.2 | 4.9 | 0.001 | 1.1 |
| Example 4 | Example 11 | 51.3 | — | 38.3 | 9.4 | 0.001 | 1 |
| Example 17 | Example 23 | 46.9 | — | 35 | 17.1 | 0.001 | 0.9 |
| Example 18 | Example 24 | 37.3 | — | 27.9 | 34.1 | 0.001 | 0.7 |
| Example 19 | Example 25 | — | 52.5 | 28.4 | 18 | 0.001 | 1.1 |
| Example 20 | Example 26 | 41.1 | — | 43 | 15 | 0.001 | 0.8 |

| Adhesive | Adhesive Sheet | Isocyanate Group/Thiol Group (molar ratio) | Component (C)/Thiol Group (molar ratio) | Thiol Functional Group Concentration (mmol/g) | NCO Functional Group Concentration (mmol/g) | Generator Concentration (mmol/g) |
|---|---|---|---|---|---|---|
| Comparative Example 19 | Comparative Example 20 | 0.5 | 0 | 4.63 | 2.32 | 0.00 |
| Example 15 | Example 21 | 0.5 | 0.01 | 4.58 | 2.29 | 0.05 |
| Example 16 | Example 22 | 0.5 | 0.05 | 4.40 | 2.20 | 0.23 |
| Example 4 | Example 11 | 0.5 | 0.1 | 4.20 | 2.10 | 0.43 |
| Example 17 | Example 23 | 0.5 | 0.2 | 3.84 | 1.92 | 0.79 |
| Example 18 | Example 24 | 0.5 | 0.5 | 3.05 | 1.53 | 1.57 |
| Example 19 | Example 25 | 0.2 | 0.2 | 4.03 | 0.81 | 0.83 |
| Example 20 | Example 26 | 0.7 | 0.2 | 3.37 | 2.36 | 0.69 |

TABLE 5

| Component (C)/Thiol Group (molar ratio) | Adhesive | Adhesion Force (N/25 mm) | Adhesive Sheet | Adhesion Force (N/25 mm) |
|---|---|---|---|---|
| 0 | Comparative Example 19 | 96 | Comparative Example 20 | 88 |
| 0.01 | Example 15 | 113 | Example 21 | 115 |
| 0.05 | Example 16 | 420 | Example 22 | 259 |

TABLE 5-continued

| Component | Adhesive | | Adhesive Sheet | |
|---|---|---|---|---|
| (C)/Thiol Group (molar ratio) | | Adhesion Force (N/25 mm) | | Adhesion Force (N/25 mm) |
| 0.1 | Example 4 | 883 | Example 11 | 929 |
| 0.2 | Example 17 | 587 | Example 23 | 850 |
| 0.5 | Example 18 | 420 | Example 24 | 763 |
| 0.2 | Example 19 | 168 | Example 25 | 150 |
| 0.2 | Example 20 | 585 | Example 26 | 680 |

TABLE 6

| Adhesive | Adhesive Sheet | Component (A) PEMP (part by mass) | Component (A) DPMP (part by mass) | Component (B) N3200 (part by mass) | Component (B) L75(C) (part by mass) | Component (C) Perbutyl O (part by mass) | Component (D) TEDA (part by mass) | Component (E) BYK-307 (part by mass) |
|---|---|---|---|---|---|---|---|---|
| Example 4 | Example 11 | 51.3 | — | 38.3 | — | 9.4 | 0.001 | 1 |
| Example 27 | Example 33 | 51.3 | — | 38.3 | — | 9.4 | 0.001 | 1 |
| Example 28 | Example 34 | 51.3 | — | 38.3 | — | 9.4 | 0.001 | 1 |
| Example 29 | Example 35 | 51.3 | — | 38.3 | — | 9.4 | 0.001 | 1 |
| Example 30 | Example 36 | 51.3 | — | 38.3 | — | 9.4 | 0.001 | 1 |
| Example 31 | Example 37 | — | 54.7 | 17.6 | 17.2 | 9.4 | 0.001 | 1.1 |
| Example 32 | Example 38 | — | 54.7 | 17.6 | 17.2 | 9.4 | 0.001 | 1.1 |

| Adhesive | Adhesive Sheet | Isocyanate Group/Thiol Group (molar ratio) | Component (C)/Thiol Group (molar ratio) | Thiol Functional Group Concentration (mmol/g) | NCO Functional Group Concentration (mmol/g) | Generator Concentration (mmol/g) |
|---|---|---|---|---|---|---|
| Example 4 | Example 11 | 0.5 | 0.1 | 4.20 | 2.10 | 0.43 |
| Example 27 | Example 33 | 0.5 | 0.1 | 4.20 | 2.10 | 0.43 |
| Example 28 | Example 34 | 0.5 | 0.1 | 4.20 | 2.10 | 0.43 |
| Example 29 | Example 35 | 0.5 | 0.1 | 4.20 | 2.10 | 0.43 |
| Example 30 | Example 36 | 0.5 | 0.1 | 4.20 | 2.10 | 0.43 |
| Example 31 | Example 37 | 0.37 | 0.1 | 4.19 | 1.55 | 0.43 |
| Example 32 | Example 38 | 0.37 | 0.1 | 4.19 | 1.55 | 0.43 |

TABLE 7

| Type of Rubber | Adhesive | Adhesion Force (N/25 mm) | Adhesive Sheet | Adhesion Force (N/25 mm) |
|---|---|---|---|---|
| NR/BR and NR/BR | Example 4 | 833 | Example 11 | 929 |
| NR/SBR and NR/SBR | Example 27 | 477 | Example 33 | 529 |
| SBR and SBR | Example 28 | 280 | Example 34 | 731 |
| NR/SBR/BR and NR/SBR/BR | Example 29 | 386 | Example 35 | 906 |
| NR/IR and NR/IR | Example 30 | 459 | Example 36 | 412 |
| NR and Steel Plate | Example 31 | 171 | Example 37 | 328 |
| NR and NR | Example 32 | 139 | Example 38 | 153 |

TABLE 8

| Adhesive | Adhesive Sheet | Component (A) Table 9 (part by mass) | Component (B) N3200 (part by mass) | Component (C) Perbutyl O (part by mass) | Component (D) TEDA (part by mass) | Component (E) BYK-307 (part by mass) |
|---|---|---|---|---|---|---|
| Example 4 | Example 11 | 51.3 | 38.3 | 9.4 | 0.001 | 1 |
| Example 39 | Example 41 | 52.9 | 37.0 | 9.0 | 0.001 | 1.1 |

TABLE 8-continued

| Adhesive | Adhesive Sheet | | | | |
|---|---|---|---|---|---|
| Example 40 | Example 42 | 59.9 | 31.2 | 7.6 | 0.001 | 1.2 |

| Adhesive | Adhesive Sheet | Isocyanate Group/Thiol Group (molar ratio) | Component (C)/Thiol Group (molar ratio) | Thiol Functional Group Concentration (mmol/g) | NCO Functional Group Concentration (mmol/g) | Generator Concentration (mmol/g) |
|---|---|---|---|---|---|---|
| Example 4 | Example 11 | 0.5 | 0.1 | 4.20 | 2.10 | 0.43 |
| Example 39 | Example 41 | 0.5 | 0.1 | 4.05 | 2.03 | 0.42 |
| Example 40 | Example 42 | 0.5 | 0.1 | 3.42 | 1.71 | 0.35 |

TABLE 9

| | Adhesive | | Adhesive Sheet | |
|---|---|---|---|---|
| Component (A) | | Adhesion Force (N/25 mm) | | Adhesion Force (N/25 mm) |
| PEMP | Example 4 | 883 | Example 11 | 929 |
| DPMP | Example 39 | 146 | Example 41 | 450 |
| TEMPIC | Example 40 | 193 | Example 42 | 450 |

TABLE 10

| | | Formulation | | | | |
|---|---|---|---|---|---|---|
| Adhesive | Adhesive Sheet | Component (A) PEMP (part by mass) | Component (B) Table 11 (part by mass) | Component (C) Perbutyl O (part by mass) | Component (D) TEDA (part by mass) | Component (E) BYK-307 (part by mass) |
| Example 4 | Example 11 | 51.3 | 38.3 | 9.4 | 0.001 | 1 |
| Example 43 | Example 52 | 51.4 | 38.1 | 9.4 | 0.001 | 1 |
| Example 44 | Example 53 | 37.8 | 54.6 | 6.9 | 0.001 | 0.8 |
| Example 45 | Example 54 | 37.9 | 54.4 | 6.9 | 0.001 | 0.8 |
| Example 46 | Example 55 | 40.1 | 51.8 | 7.3 | 0.001 | 0.8 |
| Example 47 | Example 56 | 28.6 | 65.6 | 5.2 | 0.001 | 0.6 |
| Example 48 | Example 57 | 37.1 | 55.4 | 6.8 | 0.001 | 0.7 |
| Example 49 | Example 58 | 36.2 | 56.5 | 6.6 | 0.001 | 0.7 |
| Example 50 | Example 59 | 40.4 | 51.4 | 7.4 | 0.001 | 0.8 |
| Example 51 | Example 60 | 60.4 | 27.4 | 11.0 | 0.001 | 1.2 |

| Adhesive | Adhesive Sheet | Isocyanate Group/Thiol Group (molar ratio) | Component (C)/Thiol Group (molar ratio) | Thiol Functional Group Concentration (mmol/g) | NCO Functional Group Concentration (mmol/g) | Generator Concentration (mmol/g) |
|---|---|---|---|---|---|---|
| Example 4 | Example 11 | 0.5 | 0.1 | 4.20 | 2.10 | 0.43 |
| Example 43 | Example 52 | 0.5 | 0.1 | 4.21 | 2.10 | 0.43 |
| Example 44 | Example 53 | 0.5 | 0.1 | 3.09 | 1.55 | 0.32 |
| Example 45 | Example 54 | 0.5 | 0.1 | 3.11 | 1.55 | 0.32 |
| Example 46 | Example 55 | 0.5 | 0.1 | 3.28 | 1.64 | 0.34 |
| Example 47 | Example 56 | 0.5 | 0.1 | 2.34 | 1.17 | 0.24 |
| Example 48 | Example 57 | 0.5 | 0.1 | 3.03 | 1.52 | 0.34 |
| Example 49 | Example 58 | 0.5 | 0.1 | 3.30 | 1.65 | 0.34 |
| Example 50 | Example 59 | 0.5 | 0.1 | 4.16 | 1.54 | 0.43 |
| Example 51 | Example 60 | 0.5 | 0.1 | 4.96 | 2.47 | 0.51 |

TABLE 11

| | Adhesive | | Adhesive Sheet | |
|---|---|---|---|---|
| Component (B) | | Adhesion Force (N/25 mm) | | Adhesion Force (N/25 mm) |
| N3200 | Example 4 | 883 | Example 11 | 929 |
| HXLV | Example 43 | 207 | Example 52 | 552 |
| Z4470BA | Example 44 | 305 | Example 53 | 826 |
| XP2565 | Example 45 | 403 | Example 54 | 669 |
| L75(C) | Example 46 | 123 | Example 55 | 442 |
| D-204 | Example 47 | 151 | Example 56 | 210 |
| D-110N | Example 48 | 163 | Example 57 | 344 |
| D-120N | Example 49 | 143 | Example 58 | 379 |
| D-127N | Example 50 | 286 | Example 59 | 633 |
| IPDI | Example 51 | 450 | Example 60 | 525 |

TABLE 12

| Adhesive | Adhesive Sheet | Formulation | | | | |
|---|---|---|---|---|---|---|
| | | Component (A) PEMP (part by mass) | Component (B) N3200 (part by mass) | Component (C) Table 13 (part by mass) | Component (D) TEDA (part by mass) | Component (E) BYK-307 (part by mass) |
| Example 4 | Example 11 | 51.3 | 38.3 | 9.4 | 0.001 | 1 |
| Example 61 | Example 66 | 47.6 | 35.6 | 15.9 | 0.001 | 1 |
| Example 62 | Example 67 | 49.6 | 37.1 | 12.3 | 0.001 | 1 |
| Example 63 | Example 68 | 48.6 | 36.3 | 14.1 | 0.001 | 1 |
| Example 64 | Example 69 | 52.9 | 39.5 | 6.5 | 0.001 | 1.1 |
| Example 65 | Example 70 | 51.1 | 38.2 | 9.7 | 0.001 | 1 |

| Adhesive | Adhesive Sheet | Isocyanate Group/Thiol Group (molar ratio) | Component (C)/Thiol Group (molar ratio) | Thiol Functional Group Concentration (mmol/g) | NCO Functional Group Concentration (mmol/g) | Generator Concentration (mmol/g) |
|---|---|---|---|---|---|---|
| Example 4 | Example 11 | 0.5 | 0.1 | 4.20 | 2.10 | 0.43 |
| Example 61 | Example 66 | 0.5 | 0.1 | 3.90 | 1.95 | 0.40 |
| Example 62 | Example 67 | 0.5 | 0.1 | 4.06 | 2.03 | 0.45 |
| Example 63 | Example 68 | 0.5 | 0.1 | 3.98 | 1.99 | 0.44 |
| Example 64 | Example 69 | 0.5 | 0.1 | 4.33 | 2.17 | 0.44 |
| Example 65 | Example 70 | 0.5 | 0.1 | 4.18 | 2.09 | 0.46 |

TABLE 13

| Component (C) | Adhesive | Adhesion Force (N/25 mm) | Adhesive Sheet | Adhesion Force (N/25 mm) |
|---|---|---|---|---|
| Perbutyl O | Example 4 | 883 | Example 11 | 929 |
| Perloyl L | Example 61 | 206 | Example 66 | 556 |
| Perocta O | Example 62 | 784 | Example 67 | 324 |
| Perhexa HC | Example 63 | 189 | Example 68 | 498 |
| Perbutyl D | Example 64 | 205 | Example 69 | 389 |
| Perbutyl C | Example 65 | 182 | Example 70 | 462 |

[Evaluation]

As shown in Table 2 to Table 13, with respect to Examples 1 to 70, the components (A) to (C) were incorporated and the ratio of the total molar number of the isocyanate group contained in the component (B) to the total molar number of the thiol group contained in the component (A) (isocyanate group/thiol group) fell within a range of from 0.2 to 0.78, and therefore the adhesion force was high.

On the other hand, with respect to Comparative Examples 1 to 8 and 10 to 17, the ratio (isocyanate group/thiol group) was outside the scope of the present invention, and therefore the adhesion force was low.

With respect to Comparative Examples 19 and 20, the radical generator (C) was not incorporated, and therefore, the adhesion force was low.

[Production or Rubber Article]

According to the compounding formulation shown in Table 14 below, a rubber article (100 mm in length×25 mm in width×10 mm in thickness) was produced.

The components were blended as in Table 14 below, and the resulting mixture was rolled into a sheet having a size of 150 mm in length×270 mm in width×3.4 mm in thickness. Three these sheets were layered, and vulcanized in a mold having a size of 150 mm in length×270 mm in width×10 mm in thickness at 150° C. for 45 minutes. The resultant vulcanized body was cut into pieces each having a length of 100 mm and a width of 25 mm to prepare samples for measurement of adhesion force.

TABLE 14

| | | Rubber Article | | |
|---|---|---|---|---|
| | | 1 NR/BR | 2 SBR | 3 NR |
| Compounding Formulation | NR | 50 | — | 100 |
| | BR | 50 | — | — |
| | SBR | — | 100 | — |
| | Carbon Black | 50 | 50 | 50 |
| | Stearic Acid | 2 | 2 | 2 |
| | Antiaging Agent | 1 | 1 | 1 |
| | Zinc oxide | 3 | 3 | 3 |
| | Vulcanization Accelerator 1 | 0.4 | 0.4 | 0.4 |
| | Vulcanization Accelerator 2 | 0.2 | 0.2 | 0.2 |
| | Sulfur | 1.4 | 1.4 | 1.4 |

* The numerical value in Table is part by mass.

In Table 14, the details of the components are the same as in Table 1.

[Method for Measurement of Adhesion Force of Coating Material Obtained through Coating with Coating Agent]

The coating agent was applied onto the rubber article to provide a thickness of 30 μm thereon, and the coated surface was cured. The curing mode was as follows. The coating agent only containing a photoradical generator was irradiated with UV rays at from 200 to 400 mW/cm² and at from 1000 to 4000 mJ/cm². The coating agent only containing a thermal radical generator was kept under heat at a temperature of 150° C. while given a pressure of 0.05 MPa for 30 minutes. The coating agent containing both a photoradical generator and a thermal radical generator was UV-irradiated at from 200 to 400 mW/cm² and at from 500 to 1000 mJ/cm², and then kept under heat at a temperature of 150° C. while given a pressure of 0.05 MPa for 30 minutes. The resultant coating material and rubber article were tested for the adhesion force according to the cross-cut test method in JIS K5600-5-6. The method is as follows. Using a guide, cross-cuts are made in the coating film, an adhesive cellophane tape is stuck thereto, and then the tape is peeled off at an angle of around 60° and the peeling state of the coating film is checked. In one test piece, 5×5=25 cross-cuts were made in four sites. All the sites were tested, and the number of the unpeeled cross-cuts was counted to evaluate the adhesion force.

<Evaluation Criteria>
A: 100/100 (No cross-cut peeled.)
B: (80/100) to (99/100)
C: (50/100) to (79/100)
D: (0/100) to (49/100), or immeasurable since the coating material did not cure.

[Method for Measurement of Adhesion Force of Coating Material Obtained from Coating Sheet]

The coating sheet having a thickness of 30 μm was adhered to a part of the surface of the rubber article, and then the coating sheet was cured. The curing mode is the same as that for the coating material obtained through coating with the coating agent. The adhesion force between the resultant coating material and the rubber article was measured according to the cross-cut test method in JIS K5600-5-6. The method is as follows. Using a guide, cross-cuts are made in the coating film, an adhesive cellophane tape is stuck thereto, and then the tape is peeled off at an angle of around 60° and the peeling state of the coating film is checked. In one test piece, 5×5=25 cross-cuts were made in four sites. All the sites were tested, and the number of the unpeeled cross-cuts was counted to evaluate the adhesion force.

<Evaluation Criteria>
A: 100/100 (No cross-cut peeled.)
B: (80/100) to (99/100)
C: (50/100) to (79/100)
D: (0/100) to (49/100), or immeasurable since the coating material did not cure.

The samples in which the number of the unpeeled cross-cuts is 80/100 or more have a sufficient adhesion force not easily causing peeling from the substrate of the rubber article. Preferred is 100/100.

On the other hand, the level of less than 80/100 means that the reaction between the substrate of the rubber article and the coating agent is not sufficient and the coating sheet peels at the interface. Under the condition, the adhesion force could not be said to be sufficient.

[Method for Measurement of Curability of Coating Material]

The surface of the coating material was touched with fingers to check for the presence or absence of organoleptic tackiness (adhesive feeling) thereon.
good: Not tacky.
bad: Tacky.

Examples 71 to 77 and Comparative Examples 21 to 27, and Examples 78 to 84 and Comparative Examples 28 to 34

In Examples 71 to 77 and Comparative Examples 21 to 27 (coating material obtained by coating with coating agent), the ratio of the total molar number of the isocyanate group contained in the isocyanate group-containing compound (B) to be incorporated to the total molar number of the thiol group contained in the polythiol compound (A) to be incorporated (isocyanate group/thiol group) was varied, and the relationship between the ratio (isocyanate group/thiol group) and the adhesion force to the rubber article, the curability and the decoration performance was investigated.

In Examples 78 to 84 and Comparative Examples 28 to 34 (coating material obtained from coating sheet), the relationship between the ratio (isocyanate group/thiol group) and the adhesion force to the rubber article, the curability and the decoration performance was investigated in the same manner as that in the above-mentioned Examples 71 to 77 and Comparative Examples 21 to 27 (coating material obtained by coating with coating agent) except that the coating agent was changed to the coating sheet.

Next, these Examples and Comparative Examples are described concretely.

Examples 71 to 77 and Comparative Examples 21 to 27 (Coating Material Obtained by Coating with Coating Agent)

The components were formulated as shown in Table 15 below (in which the numerical value of each component means part by mass) to give a coating composition, and the coating composition was used as a coating agent.

The resultant coating agent was cured in the manner as above, and the adhesion force of the cured coating agent was measured in the manner as above. As the rubber member, used was the rubber article 1 (NR/BR blend). The results are shown in Table 18.

In Tables 15, 16 and 17, the thiol functional group concentration means the concentration of the thiol group (mmol/g) in the total amount of the coating agent or in the total amount of the coating sheet. The NCO functional group concentration means the concentration of the isocyanate group (mmol/g) in the total amount of the coating agent or in the total amount of the coating sheet. Further, the generator concentration means the concentration of the radical generator (mmol/g) in the total amount of the coating agent or in the total amount of the coating sheet.

In these, however, the constitutive components may mutually react with each other or may decompose, and therefore, the value is one calculated before such reaction or decomposition of the constitutive components, or that is, the value is the theoretical value calculated from the amount of each constitutive component just before actually compounded.

Examples 78 to 84 and Comparative Examples 28 to 34 (Coating Material Obtained from Coating Sheet)

As shown in Table 15, in Examples 78 to 84 and Comparative Examples 28 to 34, the same coating agents as those in Examples 71 to 77 and Comparative Examples 21 to 27, respectively, were prepared.

The coating agent was applied onto a PET film-made release sheet, and kept at room temperature for 30 minutes to produce a coating sheet having a length of 100 mm, a width of 25 mm and a thickness of 30 μm.

The resultant coating sheet was cured in the manner as above, and also in the manner as above, the adhesion force of the cured coating sheet was measured. As the rubber member, the rubber article 1 (NR/BR blend) was used like in Example 1. The results are shown in Table 18.

Examples 85 to 91 and Comparative Examples 35 to 41, and Examples 92 to 98 and Comparative Examples 42 to 48

In the same manner as in Example 71 or Example 78 except that the component (C) was changed from the photoradical generator {1-hydroxycyclohexylphenyl ketone (IRGACURE 184): manufactured by BASF} to a thermal radical generator {t-butyl 2-ethylperoxyhexanoate (Perbutyl O) as shown in Table 16, the relationship between the total molar number ratio (isocyanate group/thiol group) and the adhesion force to the rubber article 1 (NR/BR blend), the curability and the decoration performance was evaluated according to the above-mentioned method. The results are shown in Table 19.

Examples 99 to 105 and Comparative Examples 49 to 56, and Examples 106 to 112 and Comparative Examples 57 to 64

In the same manner as in Example 71 or Example 78 except that the component (C) was changed to a combination of the photoradical generator {1-hydroxycyclohexyl-phenyl ketone (IRGACURE 184): manufactured by BASF} and a thermal radical generator {di-t-butyl peroxide (Perbutyl D) as shown in Table 17, the relationship between the total molar number ratio (isocyanate group/thiol group) and the adhesion force to the rubber article 1 (NR/BR blend), the curability and the decoration performance was evaluated according to the above-mentioned method. The results are shown in Table 20.

Examples 113 to 119 and Comparative Examples 65 to 71, and Examples 120 to 126 and Comparative Examples 72 to 78

Using the coating agent and the coating sheet each having the composition shown in Table 15, which is the same as in Examples 71 to 77 and Comparative Examples 21 to 27 and Examples 78 to 84 and Comparative Examples 28 to 34, the relationship between the total molar number ratio (isocyanate group/thiol group) and the adhesion force to the rubber article 2 (SBR blend), the curability and the decoration performance was evaluated according to the above-mentioned method. The results are shown in Table 21.

Examples 127 to 133 and Comparative Examples 79 to 85, and Examples 134 to 140 and Comparative Examples 86 to 92

Using the coating agent and the coating sheet each having the composition shown in Table 16, which is the same as in Examples 85 to 91 and Comparative Examples 35 to 41 and Examples 92 to 98 and Comparative Examples 42 to 48, the relationship between the total molar number ratio (isocyanate group/thiol group) and the adhesion force to the rubber article 2 (SBR blend), the curability and the decoration performance was evaluated according to the above-mentioned method. The results are shown in Table 22.

Examples 141 to 147 and Comparative Examples 93 to 100, and Examples 148 to 154 and Comparative Examples 101 to 108

Using the coating agent and the coating sheet each having the composition shown in Table 17, which is the same as in Examples 99 to 105 and Comparative Examples 49 to 56 and Examples 106 to 112 and Comparative Examples 57 to 64, the relationship between the total molar number ratio (isocyanate group/thiol group) and the adhesion force to the rubber article 2 (SBR blend), the curability and the decoration performance was evaluated according to the above-mentioned method. The results are shown in Table 23.

Examples 155 to 161 and Comparative Examples 109 to 115, and Examples 162 to 168 and Comparative Examples 116 to 122

Using the coating agent and the coating sheet each having the composition shown in Table 15, which is the same as in Examples 71 to 77 and Comparative Examples 21 to 27 and Examples 78 to 84 and Comparative Examples 28 to 34, the relationship between the total molar number ratio (isocyanate group/thiol group) and the adhesion force to the rubber article 3 (NR blend), the curability and the decoration performance was evaluated according to the above-mentioned method. The results are shown in Table 24.

Examples 169 to 175 and Comparative Examples 123 to 129, and Examples 176 to 182 and Comparative Examples 130 to 136

Using the coating agent and the coating sheet each having the composition shown in Table 16, which is the same as in Examples 85 to 91 and Comparative Examples 35 to 41 and Examples 92 to 98 and Comparative Examples 42 to 48, the relationship between the total molar number ratio (isocyanate group/thiol group) and the adhesion force to the rubber article 3 (NR blend), the curability and the decoration performance was evaluated according to the above-mentioned method. The results are shown in Table 25.

Examples 183 to 189 and Comparative Examples 137 to 144, and Examples 190 to 196 and Comparative Examples 145 to 152

Using the coating agent and the coating sheet each having the composition shown in Table 17, which is the same as in Examples 99 to 105 and Comparative Examples 49 to 56 and Examples 106 to 112 and Comparative Examples 57 to 64, the relationship between the total molar number ratio (isocyanate group/thiol group) and the adhesion force to the rubber article 3 (NR blend), the curability and the decoration performance was evaluated according to the above-mentioned method. The results are shown in Table 26.

TABLE 15

| | | Formulation | | | | | | |
|---|---|---|---|---|---|---|---|---|
| | | Component (A) | | Component (B) | | Component (C) | Component (D) | Component (E) |
| Coating Agent | Coating Sheet | PEMP (part by mass) | DPMP (part by mass) | N3200 (part by mass) | Z4470BA (part by mass) | IRGACURE 184 (part by mass) | TEDA (part by mass) | BYK-307 (part by mass) |
| Comparative Example 21 | Comparative Example 28 | 83.2 | — | — | — | 0.832 | 0.001 | 1.7 |
| Comparative Example 22 | Comparative Example 29 | 74.0 | — | 11.1 | — | 0.740 | 0.001 | 1.5 |
| Example 71 | Example 78 | — | 57.7 | — | 31.2 | 0.577 | 0.001 | 1.2 |
| Example 72 | Example 79 | — | 49.9 | — | 40.5 | 0.499 | 0.001 | 1.0 |
| Example 73 | Example 80 | 48.3 | — | — | 41.9 | 0.483 | 0.001 | 1.0 |

TABLE 15-continued

| | | | | | | | |
|---|---|---|---|---|---|---|---|
| Example 74 | Example 81 | 51.3 | — | 38.5 | — | 0.513 | 0.001 | 1.0 |
| Example 75 | Example 82 | 47.6 | — | 42.7 | — | 0.476 | 0.001 | 1.0 |
| Example 76 | Example 83 | 44.5 | — | 46.5 | — | 0.445 | 0.001 | 0.9 |
| Example 77 | Example 84 | 42.2 | — | 49.4 | — | 0.422 | 0.001 | 0.8 |
| Comparative Example 23 | Comparative Example 30 | 41.7 | — | 49.9 | — | 0.417 | 0.001 | 0.8 |
| Comparative Example 24 | Comparative Example 31 | 39.3 | — | 52.8 | — | 0.393 | 0.001 | 0.8 |
| Comparative Example 25 | Comparative Example 32 | 37.1 | — | 55.4 | — | 0.371 | 0.001 | 0.7 |
| Comparative Example 26 | Comparative Example 33 | 23.9 | — | 71.3 | — | 0.239 | 0.001 | 0.5 |
| Comparative Example 27 | Comparative Example 34 | 0.0 | — | 77.8 | — | 0.832 | 0.001 | 2.2 |

| Coating Agent | Coating Sheet | Isocyanate Group/Thiol Group (molar ratio) | Component (C)/Thiol Group (molar ratio) | Thiol Functional Group Concentration (mmol/g) | NCO Functional Group Concentration (mmol/g) | Generator Concentration (mmol/g) |
|---|---|---|---|---|---|---|
| Comparative Example 21 | Comparative Example 28 | 0.0 | 0.00555 | 6.80 | 0.00 | 0.0378 |
| Comparative Example 22 | Comparative Example 29 | 0.1 | 0.00555 | 6.05 | 0.61 | 0.0336 |
| Example 71 | Example 78 | 0.2 | 0.00593 | 4.42 | 0.88 | 0.0262 |
| Example 72 | Example 79 | 0.3 | 0.00593 | 3.83 | 1.15 | 0.0227 |
| Example 73 | Example 80 | 0.4 | 0.00555 | 4.00 | 1.20 | 0.0220 |
| Example 74 | Example 81 | 0.5 | 0.00555 | 4.20 | 2.10 | 0.0233 |
| Example 75 | Example 82 | 0.6 | 0.00555 | 3.90 | 2.34 | 0.0216 |
| Example 76 | Example 83 | 0.7 | 0.00555 | 3.64 | 2.55 | 0.0202 |
| Example 77 | Example 84 | 0.78 | 0.00555 | 3.45 | 2.70 | 0.0192 |
| Comparative Example 23 | Comparative Example 30 | 0.8 | 0.00555 | 3.41 | 2.73 | 0.0190 |
| Comparative Example 24 | Comparative Example 31 | 0.9 | 0.00555 | 3.21 | 2.89 | 0.0179 |
| Comparative Example 25 | Comparative Example 32 | 1.0 | 0.00555 | 3.03 | 3.03 | 0.0169 |
| Comparative Example 26 | Comparative Example 33 | 2.0 | 0.00555 | 1.95 | 3.91 | 0.0109 |
| Comparative Example 27 | Comparative Example 34 | no thiol group | no thiol group | 0.00 | 4.26 | 0.000 |

TABLE 16

| | | Formulation | | | | | | |
|---|---|---|---|---|---|---|---|---|
| | | Component (A) | | Component (B) | | Component (C) | Component (D) | Component (E) |
| Coating Agent | Coating Sheet | PEMP (part by mass) | DPMP (part by mass) | N3200 (part by mass) | Z4470BA (part by mass) | Perbutyl O (part by mass) | TEDA (part by mass) | BYK-307 (part by mass) |
| Comparative Example 35 | Comparative Example 42 | 83.2 | — | — | — | 15.2 | 0.001 | 1.7 |
| Comparative Example 36 | Comparative Example 43 | 74.0 | — | 11.1 | — | 13.5 | 0.001 | 1.5 |
| Example 85 | Example 92 | — | 57.7 | — | 31.2 | 9.9 | 0.001 | 1.2 |
| Example 86 | Example 93 | — | 49.9 | — | 40.5 | 8.5 | 0.001 | 1.0 |
| Example 87 | Example 94 | 48.3 | — | — | 41.9 | 8.8 | 0.001 | 1.0 |
| Example 88 | Example 95 | 51.3 | — | 38.5 | — | 9.4 | 0.001 | 1.0 |
| Example 89 | Example 96 | 47.6 | — | 42.7 | — | 8.7 | 0.001 | 1.0 |
| Example 90 | Example 97 | 44.5 | — | 46.5 | — | 8.1 | 0.001 | 0.9 |
| Example 91 | Example 98 | 42.2 | — | 49.4 | — | 7.6 | 0.001 | 0.8 |
| Comparative Example 37 | Comparative Example 44 | 41.7 | — | 49.9 | — | 7.6 | 0.001 | 0.8 |
| Comparative Example 38 | Comparative Example 45 | 39.3 | — | 52.8 | — | 7.2 | 0.001 | 0.8 |
| Comparative Example 39 | Comparative Example 46 | 37.1 | — | 55.4 | — | 6.8 | 0.001 | 0.7 |
| Comparative Example 40 | Comparative Example 47 | 23.9 | — | 71.3 | — | 4.0 | 0.001 | 0.5 |
| Comparative Example 41 | Comparative Example 48 | 0.0 | — | 77.8 | — | 20.0 | 0.001 | 2.2 |

TABLE 16-continued

| Coating Agent | Coating Sheet | Isocyanate Group/Thiol Group (molar ratio) | Component (C)/Thiol Group (molar ratio) | Thiol Functional Group Concentration (mmol/g) | NCO Functional Group Concentration (mmol/g) | Generator Concentration (mmol/g) |
|---|---|---|---|---|---|---|
| Comparative Example 35 | Comparative Example 42 | 0.0 | 0.10 | 6.80 | 0.00 | 0.70 |
| Comparative Example 36 | Comparative Example 43 | 0.1 | 0.10 | 6.05 | 0.61 | 0.62 |
| Example 85 | Example 92 | 0.2 | 0.10 | 4.42 | 0.88 | 0.46 |
| Example 86 | Example 93 | 0.3 | 0.10 | 3.83 | 1.15 | 0.39 |
| Example 87 | Example 94 | 0.4 | 0.10 | 4.00 | 1.20 | 0.40 |
| Example 88 | Example 95 | 0.5 | 0.10 | 4.20 | 2.10 | 0.43 |
| Example 89 | Example 96 | 0.6 | 0.10 | 3.90 | 2.34 | 0.40 |
| Example 90 | Example 97 | 0.7 | 0.10 | 3.64 | 2.55 | 0.38 |
| Example 91 | Example 98 | 0.78 | 0.10 | 3.45 | 2.70 | 0.35 |
| Comparative Example 37 | Comparative Example 44 | 0.8 | 0.10 | 3.41 | 2.73 | 0.35 |
| Comparative Example 38 | Comparative Example 45 | 0.9 | 0.10 | 3.21 | 2.89 | 0.33 |
| Comparative Example 39 | Comparative Example 46 | 1.0 | 0.10 | 3.03 | 3.03 | 0.31 |
| Comparative Example 40 | Comparative Example 47 | 2.0 | 0.10 | 1.95 | 3.91 | 0.20 |
| Comparative Example 41 | Comparative Example 48 | no thiol group | 0.00 | 0.00 | 4.26 | 0.92 |

TABLE 17

| | | Formulation | | | | | | | |
|---|---|---|---|---|---|---|---|---|---|
| | | Component (A) | | Component (B) | | Component (C) | | Component (D) | Component (E) |
| Coating Agent | Coating Sheet | PEMP (part by mass) | DPMP (part by mass) | N3200 (part by mass) | Z4470BA (part by mass) | IRGACURE 184 (part by mass) | Perbutyl D (part by mass) | TEDA (part by mass) | BYK-307 (part by mass) |
| Comparative Example 49 | Comparative Example 57 | 83.2 | — | — | — | 0.832 | 15.2 | 0.001 | 1.7 |
| Comparative Example 50 | Comparative Example 58 | 74.0 | — | 11.1 | — | 0.74 | 13.5 | 0.001 | 1.5 |
| Example 99 | Example 106 | — | 57.7 | — | 31.2 | 0.577 | 9.9 | 0.001 | 1.2 |
| Example 100 | Example 107 | — | 49.9 | — | 40.5 | 0.499 | 8.5 | 0.001 | 1.0 |
| Example 101 | Example 108 | 48.3 | — | — | 41.9 | 0.483 | 8.8 | 0.001 | 1.0 |
| Example 102 | Example 109 | 51.3 | — | 38.5 | — | 0.513 | 9.4 | 0.001 | 1.0 |
| Example 103 | Example 110 | 47.6 | — | 42.7 | — | 0.476 | 8.7 | 0.001 | 1.0 |
| Example 104 | Example 111 | 44.5 | — | 46.5 | — | 0.445 | 8.1 | 0.001 | 0.9 |
| Example 105 | Example 112 | 42.2 | — | 49.4 | — | 0.422 | 7.6 | 0.001 | 0.8 |
| Comparative Example 51 | Comparative Example 59 | 41.7 | — | 49.9 | — | 0.417 | 7.6 | 0.001 | 0.8 |
| Comparative Example 52 | Comparative Example 60 | 39.3 | — | 52.8 | — | 0.393 | 7.2 | 0.001 | 0.8 |
| Comparative Example 53 | Comparative Example 61 | 37.1 | — | 55.4 | — | 0.371 | 6.8 | 0.001 | 0.7 |
| Comparative Example 54 | Comparative Example 62 | 23.9 | — | 71.3 | — | 0.239 | 4.0 | 0.001 | 0.5 |
| Comparative Example 55 | Comparative Example 63 | 0.0 | — | 77.8 | — | 0.832 | 20.0 | 0.001 | 2.2 |
| Comparative Example 56 | Comparative Example 64 | 47.6 | — | 42.7 | — | — | — | 0.001 | 1 |

| Coating Agent | Coating Sheet | Isocyanate Group/Thiol Group (molar ratio) | Component (C)/Thiol Group (molar ratio) | Thiol Functional Group Concentration (mmol/g) | NCO Functional Group Concentration (mmol/g) | Generator Concentration (mmol/g) |
|---|---|---|---|---|---|---|
| Comparative Example 49 | Comparative Example 57 | 0.0 | 0.10 | 6.80 | 0.00 | 0.74 |
| Comparative Example 50 | Comparative Example 58 | 0.1 | 0.10 | 6.05 | 0.61 | 0.65 |
| Example 99 | Example 106 | 0.2 | 0.10 | 4.42 | 0.88 | 0.49 |
| Example 100 | Example 107 | 0.3 | 0.10 | 3.83 | 1.15 | 0.41 |
| Example 101 | Example 108 | 0.4 | 0.10 | 4.00 | 1.20 | 0.42 |
| Example 102 | Example 109 | 0.5 | 0.10 | 4.20 | 2.10 | 0.45 |
| Example 103 | Example 110 | 0.6 | 0.10 | 3.90 | 2.34 | 0.42 |
| Example 104 | Example 111 | 0.7 | 0.10 | 3.64 | 2.55 | 0.40 |
| Example 105 | Example 112 | 0.78 | 0.10 | 3.45 | 2.70 | 0.37 |

TABLE 17-continued

| | | | | | | |
|---|---|---|---|---|---|---|
| Comparative Example 51 | Comparative Example 59 | 0.8 | 0.10 | 3.41 | 2.73 | 0.37 |
| Comparative Example 52 | Comparative Example 60 | 0.9 | 0.10 | 3.21 | 2.89 | 0.35 |
| Comparative Example 53 | Comparative Example 61 | 1.0 | 0.10 | 3.03 | 3.03 | 0.33 |
| Comparative Example 54 | Comparative Example 62 | 2.0 | 0.10 | 1.95 | 3.91 | 0.21 |
| Comparative Example 55 | Comparative Example 63 | no thiol group | 0.00 | 0.00 | 4.26 | 0.95 |
| Comparative Example 56 | Comparative Example 64 | 0.6 | 0.00 | 3.90 | 2.34 | 0.40 |

TABLE 18

| Isocyanate Group/Thiol Group (molar ratio) | Coating Agent | | | Coating Sheet | | | |
|---|---|---|---|---|---|---|---|
| | | Adhesion Force | Curability | Decoration Performance | | Adhesion Force | Curability | Decoration Performance |
| 0 | Comparative Example 21 | D | bad | bad | Comparative Example 28 | D | bad | bad |
| 0.1 | Comparative Example 22 | D | bad | bad | Comparative Example 29 | D | bad | bad |
| 0.2 | Example 71 | B | good | good | Example 78 | B | good | good |
| 0.3 | Example 72 | A | good | good | Example 79 | A | good | good |
| 0.4 | Example 73 | A | good | good | Example 80 | A | good | good |
| 0.5 | Example 74 | A | good | good | Example 81 | A | good | good |
| 0.6 | Example 75 | A | good | good | Example 82 | A | good | good |
| 0.7 | Example 76 | A | good | good | Example 83 | A | good | good |
| 0.78 | Example 77 | B | good | good | Example 84 | A | good | good |
| 0.8 | Comparative Example 23 | C | good | good | Comparative Example 30 | C | good | good |
| 0.9 | Comparative Example 24 | D | good | good | Comparative Example 31 | C | good | good |
| 1 | Comparative Example 25 | D | good | good | Comparative Example 32 | D | good | good |
| 2 | Comparative Example 26 | D | good | good | Comparative Example 33 | D | good | good |
| no thiol group | Comparative Example 27 | D | bad | bad | Comparative Example 34 | D | bad | bad |

TABLE 19

| Isocyanate Group/Thiol Group (molar ratio) | Coating Agent | | | Coating Sheet | | | |
|---|---|---|---|---|---|---|---|
| | | Adhesion Force | Curability | Decoration Performance | | Adhesion Force | Curability | Decoration Performance |
| 0 | Comparative Example 35 | D | bad | bad | Comparative Example 42 | D | bad | bad |
| 0.1 | Comparative Example 36 | D | bad | bad | Comparative Example 43 | D | bad | bad |
| 0.2 | Example 85 | B | good | good | Example 92 | B | good | good |
| 0.3 | Example 86 | A | good | good | Example 93 | A | good | good |
| 0.4 | Example 87 | A | good | good | Example 94 | A | good | good |
| 0.5 | Example 88 | A | good | good | Example 95 | A | good | good |
| 0.6 | Example 89 | A | good | good | Example 96 | A | good | good |
| 0.7 | Example 90 | A | good | good | Example 97 | A | good | good |
| 0.78 | Example 91 | B | good | good | Example 98 | A | good | good |
| 0.8 | Comparative Example 37 | C | good | good | Comparative Example 44 | C | good | good |
| 0.9 | Comparative Example 38 | D | good | good | Comparative Example 45 | C | good | good |
| 1 | Comparative Example 39 | D | good | good | Comparative Example 46 | D | good | good |

TABLE 19-continued

| Isocyanate Group/Thiol Group (molar ratio) | Coating Agent | | | Coating Sheet | | | |
|---|---|---|---|---|---|---|---|
| | | Adhesion Force | Curability | Decoration Performance | | Adhesion Force | Curability | Decoration Performance |
| 2 | Comparative Example 40 | D | good | good | Comparative Example 47 | D | good | good |
| no thiol group | Comparative Example 41 | D | bad | bad | Comparative Example 48 | D | bad | bad |

TABLE 20

| Isocyanate Group/Thiol Group (molar ratio) | Coating Agent | | | | Coating Sheet | | | |
|---|---|---|---|---|---|---|---|---|
| | | Adhesion Force | Curability | Decoration Performance | | Adhesion Force | Curability | Decoration Performance |
| 0 | Comparative Example 49 | D | bad | bad | Comparative Example 57 | D | bad | bad |
| 0.1 | Comparative Example 50 | D | bad | bad | Comparative Example 58 | D | bad | bad |
| 0.2 | Example 99 | B | good | good | Example 106 | B | good | good |
| 0.3 | Example 100 | A | good | good | Example 107 | A | good | good |
| 0.4 | Example 101 | A | good | good | Example 108 | A | good | good |
| 0.5 | Example 102 | A | good | good | Example 109 | A | good | good |
| 0.6 | Example 103 | A | good | good | Example 110 | A | good | good |
| 0.7 | Example 104 | A | good | good | Example 111 | A | good | good |
| 0.78 | Example 105 | B | good | good | Example 112 | A | good | good |
| 0.8 | Comparative Example 51 | C | good | good | Comparative Example 59 | C | good | good |
| 0.9 | Comparative Example 52 | D | good | good | Comparative Example 60 | C | good | good |
| 1 | Comparative Example 53 | D | good | good | Comparative Example 61 | D | good | good |
| 2 | Comparative Example 54 | D | good | good | Comparative Example 62 | D | good | good |
| no thiol group | Comparative Example 55 | D | bad | bad | Comparative Example 63 | D | bad | bad |
| no component (C) | Comparative Example 56 | D | bad | bad | Comparative Example 64 | D | bad | bad |

TABLE 21

| Isocyanate Group/Thiol Group (molar ratio) | Coating Agent | | | | Coating Sheet | | | |
|---|---|---|---|---|---|---|---|---|
| | | Adhesion Force | Curability | Decoration Performance | | Adhesion Force | Curability | Decoration Performance |
| 0 | Comparative Example 65 | D | bad | bad | Comparative Example 72 | D | bad | bad |
| 0.1 | Comparative Example 66 | D | bad | bad | Comparative Example 73 | D | bad | bad |
| 0.2 | Example 113 | B | good | good | Example 120 | B | good | good |
| 0.3 | Example 114 | A | good | good | Example 121 | A | good | good |
| 0.4 | Example 115 | A | good | good | Example 122 | A | good | good |
| 0.5 | Example 116 | A | good | good | Example 123 | A | good | good |
| 0.6 | Example 117 | A | good | good | Example 124 | A | good | good |
| 0.7 | Example 118 | A | good | good | Example 125 | A | good | good |
| 0.78 | Example 119 | B | good | good | Example 126 | A | good | good |
| 0.8 | Comparative Example 67 | C | good | good | Comparative Example 74 | C | good | good |
| 0.9 | Comparative Example 68 | D | good | good | Comparative Example 75 | C | good | good |
| 1 | Comparative Example 69 | D | good | good | Comparative Example 76 | D | good | good |
| 2 | Comparative Example 70 | D | good | good | Comparative Example 77 | D | good | good |

TABLE 21-continued

| Isocyanate Group/Thiol Group (molar ratio) | Coating Agent | | | | Coating Sheet | | | |
|---|---|---|---|---|---|---|---|---|
| | | Adhesion Force | Curability | Decoration Performance | | Adhesion Force | Curability | Decoration Performance |
| no thiol group | Comparative Example 71 | D | bad | bad | Comparative Example 78 | D | bad | bad |

TABLE 22

| Isocyanate Group/Thiol Group (molar ratio) | Coating Agent | | | | Coating Sheet | | | |
|---|---|---|---|---|---|---|---|---|
| | | Adhesion Force | Curability | Decoration Performance | | Adhesion Force | Curability | Decoration Performance |
| 0 | Comparative Example 79 | D | bad | bad | Comparative Example 86 | D | bad | bad |
| 0.1 | Comparative Example 80 | D | bad | bad | Comparative Example 87 | D | bad | bad |
| 0.2 | Example 127 | B | good | good | Example 134 | B | good | good |
| 0.3 | Example 128 | A | good | good | Example 135 | A | good | good |
| 0.4 | Example 129 | A | good | good | Example 136 | A | good | good |
| 0.5 | Example 130 | A | good | good | Example 137 | A | good | good |
| 0.6 | Example 131 | A | good | good | Example 138 | A | good | good |
| 0.7 | Example 132 | A | good | good | Example 139 | A | good | good |
| 0.78 | Example 133 | B | good | good | Example 140 | A | good | good |
| 0.8 | Comparative Example 81 | C | good | good | Comparative Example 88 | C | good | good |
| 0.9 | Comparative Example 82 | D | good | good | Comparative Example 89 | C | good | good |
| 1 | Comparative Example 83 | D | good | good | Comparative Example 90 | D | good | good |
| 2 | Comparative Example 84 | D | good | good | Comparative Example 91 | D | good | good |
| no thiol group | Comparative Example 85 | D | bad | bad | Comparative Example 92 | D | bad | bad |

TABLE 23

| Isocyanate Group/Thiol Group (molar ratio) | Coating Agent | | | | Coating Sheet | | | |
|---|---|---|---|---|---|---|---|---|
| | | Adhesion Force | Curability | Decoration Performance | | Adhesion Force | Curability | Decoration Performance |
| 0 | Comparative Example 93 | D | bad | bad | Comparative Example 101 | D | bad | bad |
| 0.1 | Comparative Example 94 | D | bad | bad | Comparative Example 102 | D | bad | bad |
| 0.2 | Example 141 | B | good | good | Example 148 | B | good | good |
| 0.3 | Example 142 | A | good | good | Example 149 | A | good | good |
| 0.4 | Example 143 | A | good | good | Example 150 | A | good | good |
| 0.5 | Example 144 | A | good | good | Example 151 | A | good | good |
| 0.6 | Example 145 | A | good | good | Example 152 | A | good | good |
| 0.7 | Example 145 | A | good | good | Example 153 | A | good | good |
| 0.78 | Example 147 | B | good | good | Example 154 | A | good | good |
| 0.8 | Comparative Example 95 | C | good | good | Comparative Example 103 | C | good | good |
| 0.9 | Comparative Example 96 | D | good | good | Comparative Example 104 | C | good | good |
| 1 | Comparative Example 97 | D | good | good | Comparative Example 105 | D | good | good |
| 2 | Comparative Example 98 | D | good | good | Comparative Example 106 | D | good | good |
| no thiol group | Comparative Example 99 | D | bad | bad | Comparative Example 107 | D | bad | bad |
| no component (C) | Comparative Example 100 | D | bad | bad | Comparative Example 108 | D | bad | bad |

TABLE 24

| Isocyanate Group/Thiol Group (molar ratio) | Coating Agent | Adhesion Force | Curability | Decoration Performance | Coating Sheet | Adhesion Force | Curability | Decoration Performance |
|---|---|---|---|---|---|---|---|---|
| 0 | Comparative Example 109 | D | bad | bad | Comparative Example 116 | D | bad | bad |
| 0.1 | Comparative Example 110 | D | bad | bad | Comparative Example 117 | D | bad | bad |
| 0.2 | Example 155 | B | good | good | Example 162 | B | good | good |
| 0.3 | Example 156 | A | good | good | Example 163 | A | good | good |
| 0.4 | Example 157 | A | good | good | Example 164 | A | good | good |
| 0.5 | Example 158 | A | good | good | Example 165 | A | good | good |
| 0.6 | Example 159 | A | good | good | Example 166 | A | good | good |
| 0.7 | Example 160 | A | good | good | Example 167 | A | good | good |
| 0.78 | Example 161 | B | good | good | Example 168 | A | good | good |
| 0.8 | Comparative Example 111 | C | good | good | Comparative Example 118 | C | good | good |
| 0.9 | Comparative Example 112 | D | good | good | Comparative Example 119 | C | good | good |
| 1 | Comparative Example 113 | D | good | good | Comparative Example 120 | D | good | good |
| 2 | Comparative Example 114 | D | good | good | Comparative Example 121 | D | good | good |
| no thiol group | Comparative Example 115 | D | bad | bad | Comparative Example 122 | D | bad | bad |

TABLE 25

| Isocyanate Group/Thiol Group (molar ratio) | Coating Agent | Adhesion Force | Curability | Decoration Performance | Coating Sheet | Adhesion Force | Curability | Decoration Performance |
|---|---|---|---|---|---|---|---|---|
| 0 | Comparative Example 123 | D | bad | bad | Comparative Example 130 | D | bad | bad |
| 0.1 | Comparative Example 124 | D | bad | bad | Comparative Example 131 | D | bad | bad |
| 0.2 | Example 169 | B | good | good | Example 176 | B | good | good |
| 0.3 | Example 170 | A | good | good | Example 177 | A | good | good |
| 0.4 | Example 171 | A | good | good | Example 178 | A | good | good |
| 0.5 | Example 172 | A | good | good | Example 179 | A | good | good |
| 0.6 | Example 173 | A | good | good | Example 180 | A | good | good |
| 0.7 | Example 174 | A | good | good | Example 181 | A | good | good |
| 0.78 | Example 175 | B | good | good | Example 182 | A | good | good |
| 0.8 | Comparative Example 125 | C | good | good | Comparative Example 132 | C | good | good |
| 0.9 | Comparative Example 126 | D | good | good | Comparative Example 133 | C | good | good |
| 1 | Comparative Example 127 | D | good | good | Comparative Example 134 | D | good | good |
| 2 | Comparative Example 128 | D | good | good | Comparative Example 135 | D | good | good |
| no thiol group | Comparative Example 129 | D | bad | bad | Comparative Example 136 | D | bad | bad |

TABLE 26

| Isocyanate Group/Thiol Group (molar ratio) | Coating Agent | Adhesion Force | Curability | Decoration Performance | Coating Sheet | Adhesion Force | Curability | Decoration Performance |
|---|---|---|---|---|---|---|---|---|
| 0 | Comparative Example 137 | D | bad | bad | Comparative Example 145 | D | bad | bad |
| 0.1 | Comparative Example 138 | D | bad | bad | Comparative Example 146 | D | bad | bad |

TABLE 26-continued

| Isocyanate Group/Thiol Group (molar ratio) | Coating Agent | | | | Coating Sheet | | | |
|---|---|---|---|---|---|---|---|---|
| | | Adhesion Force | Curability | Decoration Performance | | Adhesion Force | Curability | Decoration Performance |
| 0.2 | Example 183 | B | good | good | Example 190 | B | good | good |
| 0.3 | Example 184 | A | good | good | Example 191 | A | good | good |
| 0.4 | Example 185 | A | good | good | Example 192 | A | good | good |
| 0.5 | Example 186 | A | good | good | Example 193 | A | good | good |
| 0.6 | Example 187 | A | good | good | Example 194 | A | good | good |
| 0.7 | Example 188 | A | good | good | Example 195 | A | good | good |
| 0.78 | Example 189 | B | good | good | Example 196 | A | good | good |
| 0.8 | Comparative Example 139 | C | good | good | Comparative Example 147 | C | good | good |
| 0.9 | Comparative Example 140 | D | good | good | Comparative Example 148 | C | good | good |
| 1 | Comparative Example 141 | D | good | good | Comparative Example 149 | D | good | good |
| 2 | Comparative Example 142 | D | good | good | Comparative Example 150 | D | good | good |
| no thiol group | Comparative Example 143 | D | bad | bad | Comparative Example 151 | D | bad | bad |
| no component (C) | Comparative Example 144 | D | bad | bad | Comparative Example 152 | D | bad | bad |

[Evaluation]

As shown in Table 15 to Table 26, Examples 78 to 196 contained the components (A) to (C) and in these, the ratio of the total molar number of the isocyanate group contained in the component (B) to the total molar number of the thiol group contained in the component (A) (isocyanate group/thiol group) fell within a range of from 0.2 to 0.78, and therefore the adhesion force, the curability and the decoration performance in these were all good.

On the other hand, in Comparative Examples 21 to 114, the ratio (isocyanate group/thiol group) was less than 0.2 or more than 0.78, or the component (C) was not used, and therefore the adhesion force was low.

As in the above, according to the production method of the present invention, the carbon atom in the rubber of the rubber layer kept in contact with a coating agent or a coating sheet forms a carbon-sulfur bond with the sulfur atom of the thiol group in the polythiol compound (A) that the coating agent or the coating sheet has, and therefore the coating agent or sheet can exhibit strong adhesion force to provide a coating material capable of easily and strongly adhering to the rubber layer not taking any troublesome labor.

INDUSTRIAL APPLICABILITY

The composition, the adhesive, the adhesive sheet, the coating agent and the coating sheet in the present invention can be utilized for favorable adhesion and favorable airtight fixation to rubber, especially to vulcanized rubber, and are therefore favorable for production of bonded bodies of rubber, especially vulcanized rubber and various adherends, and are favorable for production of rubber composites comprising rubber articles, especially vulcanized rubber articles and coating materials well adhering to each other; and the laminate of the present invention is utilizable especially for tires and various industrial rubber articles, for example, for rubber hoses, vibration isolator rubbers, rubber belts, rubber dams, belt conveyors, packings, etc.

The invention claimed is:

1. A method for producing a laminate that comprises a bonded body of a rubber and an adherend, the method comprising:
applying an adhesive that contains a composition prepared by blending a polythiol compound (A), an isocyanate group-containing compound (B) and a radical generator (C), in which the ratio of the total molar number of the isocyanate group contained in the isocyanate-containing compound (B) to the total molar number of the thiol group contained in the polythiol compound (A) (isocyanate group/thiol group) is from 0.2 to 0.78, to at least one of the rubber and the adherend to give a layered body of the rubber and the adherend via the applied adhesive therebetween,
and then subjecting the layered body to at least one of heating and photoirradiation.

2. A method for producing a laminate that comprises a bonded body of a rubber and an adherend, the method comprising:
forming an adhesive sheet that contains a polythiol compound (A), an isocyanate group-containing compound (B) and a radical generator (C), in which the ratio of the total molar number of the isocyanate group contained in the isocyanate-containing compound (B) to the total molar number of the thiol group contained in the polythiol compound (A) (isocyanate group/thiol group) is from 0.2 to 0.78,
then layering the rubber and the adherend via the adhesive sheet to prepare a layered body,
and thereafter subjecting the layered body to at least one of heating and photoirradiation.

3. The method for producing a laminate according to claim 1, wherein the ratio of the total molar number of the radical initiator (C) to the total molar number of the thiol group contained in the polythiol compound (A) (radical initiator (C)/thiol group) is from 0.025 or more.

4. The method for producing a laminate according to claim 2, wherein the ratio of the total molar number of the radical initiator (C) to the total molar number of the thiol group contained in the polythiol compound (A) (radical initiator (C)/thiol group) is from 0.025 or more.

5. The method for producing a laminate according to claim 1, wherein the radical generator (C) contains a thermal radical generator that comprises a peroxide.

6. The method for producing a laminate according to claim 2, wherein the radical generator (C) contains a thermal radical generator that comprises a peroxide.

7. The method for producing a laminate according to claim 1, wherein the radical generator (C) contains a photoradical generator, and the ratio of the total molar number of the photoradical generator to the total molar number of the thiol group contained in the polythiol compound (A) (photoradical generator/thiol group) is 0.0005 or more.

8. The method for producing a laminate according to claim 2, wherein the radical generator (C) contains a photoradical generator, and the ratio of the total molar number of the photoradical generator to the total molar number of the thiol group contained in the polythiol compound (A) (photoradical generator/thiol group) is 0.0005 or more.

9. The method for producing a laminate according to claim 1, wherein the composition contains a urethanation catalyst (D).

10. The method for producing a laminate according to claim 2, wherein the composition contains a urethanation catalyst (D).

11. The method for producing a laminate according to claim 1, wherein the rubber comprises at least one or more rubber layers, and at least one layer of the rubber layers is adhered to the adjacent layer via an adhesive layer that comprises the composition.

12. The method for producing a laminate according to claim 2, wherein the rubber comprises at least one or more rubber layers, and at least one layer of the rubber layers is adhered to the adjacent layer via an adhesive layer that comprises the composition.

* * * * *